US010956162B2

(12) United States Patent
Clancy et al.

(10) Patent No.: US 10,956,162 B2
(45) Date of Patent: Mar. 23, 2021

(54) OPERAND-BASED REACH EXPLICIT DATAFLOW PROCESSORS, AND RELATED METHODS AND COMPUTER-READABLE MEDIA

(71) Applicant: Microsoft Technology Licensing, LLC, Redmond, WA (US)

(72) Inventors: Robert Douglas Clancy, Cary, NC (US); Melinda Joyce Brown, Raleigh, NC (US); Yusuf Cagatay Tekmen, Raleigh, NC (US); Brian Michael Stempel, Raleigh, NC (US); Michael Scott Mcilvaine, Raleigh, NC (US); Thomas Philip Speier, Wake Forest, NC (US); Rodney Wayne Smith, Raleigh, NC (US); Gagan Gupta, Bellvue, WA (US); David Tennyson Harper, III, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/456,836

(22) Filed: Jun. 28, 2019

(65) Prior Publication Data

US 2020/0409712 A1    Dec. 31, 2020

(51) Int. Cl.
*G06F 9/38* (2018.01)
(52) U.S. Cl.
CPC .......... *G06F 9/3836* (2013.01); *G06F 9/3824* (2013.01)
(58) Field of Classification Search
CPC .............................. G06F 9/3836; G06F 9/3824
See application file for complete search history.

(56) References Cited

U.S. PATENT DOCUMENTS

| 5,699,537 A | * | 12/1997 | Sharangpani | ......... | G06F 9/3822 |
| | | | | | 712/217 |
| 5,941,983 A | * | 8/1999 | Gupta | ................... | G06F 9/3851 |
| | | | | | 712/214 |

(Continued)

OTHER PUBLICATIONS

Lai, et al., "A Pipeline Bubbles Reduction Technique for The Monsoon Dataflow Architecture", In Proceedings of the Twenty-Seventh Hawaii International Conference on System Sciences, Jan. 4, 1994, pp. 388-397.

(Continued)

*Primary Examiner* — Farley Abad
(74) *Attorney, Agent, or Firm* — Withrow & Terranova, PLLC

(57) ABSTRACT

Operand-based reach explicit dataflow processors, and related methods and computer-readable media are disclosed. The operand-based reach explicit dataflow processors support execution of a producer instruction that explicitly names a target consumer operand of a consumer instruction in a consumer operand encoding namespace of the producer instruction. The produced value from execution of the producer instruction is provided or otherwise made available as an input to the named target consumer operand of the consumer instruction as a result of processing the producer instruction. The target consumer operand is encoded in the producer instruction as an operand target distance relative to the producer instruction. Instructions in an instruction stream between the producer instruction and the targeted consumer instruction that have no operands do not consume an operand reach namespace in the producer instructions. This provides for a deeper explicit consumer naming reach for a given bit size of the operand reach namespace.

30 Claims, 13 Drawing Sheets

(56) References Cited

U.S. PATENT DOCUMENTS

| | | | | |
|---|---|---|---|---|
| 8,145,882 | B1* | 3/2012 | Kishore | G06F 15/16 |
| | | | | 712/34 |
| 9,146,873 | B2* | 9/2015 | Vasudevan | H04L 49/90 |
| 9,600,288 | B1* | 3/2017 | Potter | G06F 9/3826 |
| 2009/0254735 | A1* | 10/2009 | Col | G06F 9/3836 |
| | | | | 712/208 |
| 2015/0127928 | A1* | 5/2015 | Burger | G06F 9/3814 |
| | | | | 712/229 |
| 2016/0019060 | A1* | 1/2016 | Chatha | G06F 9/3836 |
| | | | | 712/241 |
| 2017/0083316 | A1* | 3/2017 | Burger | G06F 9/30043 |
| 2017/0083322 | A1 | 3/2017 | Burger et al. | |
| 2017/0083341 | A1* | 3/2017 | Burger | G06F 9/3842 |
| 2017/0357513 | A1 | 12/2017 | Ayub et al. | |

OTHER PUBLICATIONS

"International Search Report and Written Opinion Issued in PCT Application No. PCT/US2020/032540", dated Aug. 13, 2020, 13 Pages.

* cited by examiner

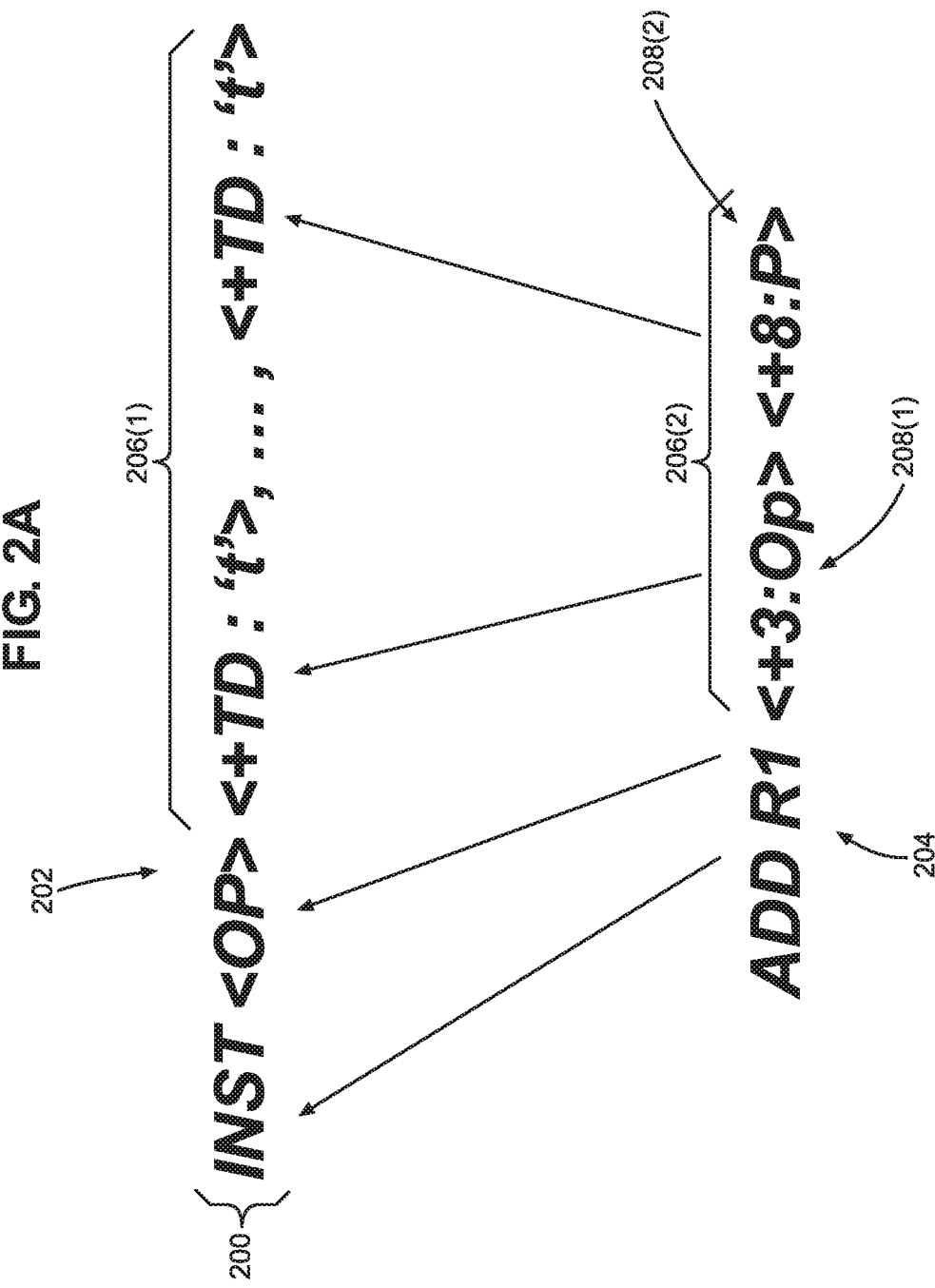

INSTRUCTION STREAM (300)

```
I0: READ GPR0 <+1:Op>    # I0 READ has no operands, targets 1st data
                         # operand away from itself.

I1: READ GPR1 <+2:Op>    # I1 READ has no operands, targets 2nd data
                         # operand away from itself.

I2: ADD <??>             # I2 ADD has an Op0 and Op1, consumes 1st data
                         # result for Op0, consumes 2nd data result for
                         # Op1.
```

FIG. 3A

INSTRUCTION STREAM (302)

```
I0: READ GPR0 <+2:0>     # I0 READ targets I2 ADD Op0.

I1: READ GPR1 <+1:1>     # I1 READ targets I2 ADD Op1.

I2: ADD <??>             # I2 ADD has an Op0 and Op1, consumes 1st data
                         # result for Op0, consumes 2nd data result for
                         # Op1.
```

FIG. 3B

INSTRUCTION STREAM (304)

```
I0: READ GPR0 <+1:Op>           # Memory Address for LDP (sent to I2 LDP Op0)

I1: READ GPR1 <+3:Op>           # Memory address for ST_T (sent to I4 ST_T  Op0)

I2: LDP <+1:Op, +3:Op>          # Loads a pair of data values, first value sent to I3 TEQZ Op0,
                                # second value sent to I4 ST_T Op1.

I3: TEQZ <+1:P>                 # Compares Op0 to zero (predicate sent to I3 ST_T).

I4: ST_T                        # Conditionally stores out Op1 to Op0's memory address based on
                                # I3 TEQZ's predicate.
```

FIG. 3C

INSTRUCTION STREAM (400)

```
I0: READ GPR0 <+3:0, +5:0>    # Memory Base Register (sent to I3 FUSEDLD Op0 +
                              #  I5 FUSEDST_T Op0)
I1: READ GPR1 <+3:1>          # Operand to be tested (sent to I4 FUSEDTEQ Op1)

I2: READ GPR2 <+3:1>          # Operand to be stored upon a successful test
                              # (sent to I5 FUSEDST_T Op1)
I3: FUSEDLD <+1:0>            # Memory to be tested (sent to I4 FUSEDTEQ Op0)

I4: FUSEDTEQ <+1:P>           # Tests equivalence (sends predicate to I5 FUSEDST_T)

I5: FUSEDST_T                 # I5 FUSEDST_T stores out the exchange operand upon a
                              # successful predicate from I4 FUSEDTEQ
```

FIG. 4A

INSTRUCTION STREAM (402)

```
I0: READ GPR0 <+1:Op>         # Memory Address (sent to I3 Op0)

I1: READ GPR1 <+2:Op>         # Operand to be tested (sent to I3 Op1)

I2: READ GPR2 <+3:Op>         # Operand to be stored upon a successful test
                              # (sent to I3 Op2)
I3: CMPXCHG                   # Loads value from memory address,
                              # compares to first data operand,
                              # and stores out a second data operand to the same memory
                              # address upon a successful equivalence test.
```

FIG. 4B

INSTRUCTION STREAM (700)

```
I0:  READ GPR0 <+5:0, +6:0>     # I0  READ provides base address for load pair (sent to I5 LW Op0 + I6 MOV tree)
I1:  READ GPR1 <+8:1>           # I1  READ provides first compare operand (sent to I9 TEQ Op1)
I2:  READ GPR2 <+8:1>           # I2  READ provides second compare operand (sent to I10 TEQ_T Op1)
I3:  READ GPR3 <+8:1>           # I3  READ provides first exchange operand (sent to I11 SW_T Op1)
I4:  READ GPR4 <+8:1>           # I4  READ provides second exchange operand (sent to I12 SW_T Op1)
I5:  LW <+4:0>                  # I5  LW loads the first memory location for compare (sent to I9 TEQ Op0)
I6:  MOV <+1:0, +5:0>           # I6  MOV tree for base address of load pair (sent to I7 ADDI Op0 + I11 SW_T Op0)
I7:  ADDI <+1:0, +5:0>, +4      # I7  ADDI increments base address for load pair (sent to I8 LW Op0 + I12 SW_T Op0)
I8:  LW <+2:0>                  # I8  LW loads the second memory location for compare (sent to I10 TEQ_T Op0)
I9:  TEQ <+1:P>                 # I9  TEQ compares the first memory location to GPR1, produces predicate for I10 TEQ_T
I10: TEQ_T <+1:P, +2:P>         # I10 TEQ_T compares the second memory location to GPR2, produces predicate for I11/I12 SW_T's
I11: SW_T                       # I11 SW_T performs exchange of GPR3 with first memory location, predicated on successful TEQ's
I12: SW_T                       # I12 SW_T performs exchange of GPR4 with second memory location, predicated on successful TEQ's
```

FIG. 7A

INSTRUCTION STREAM (702)

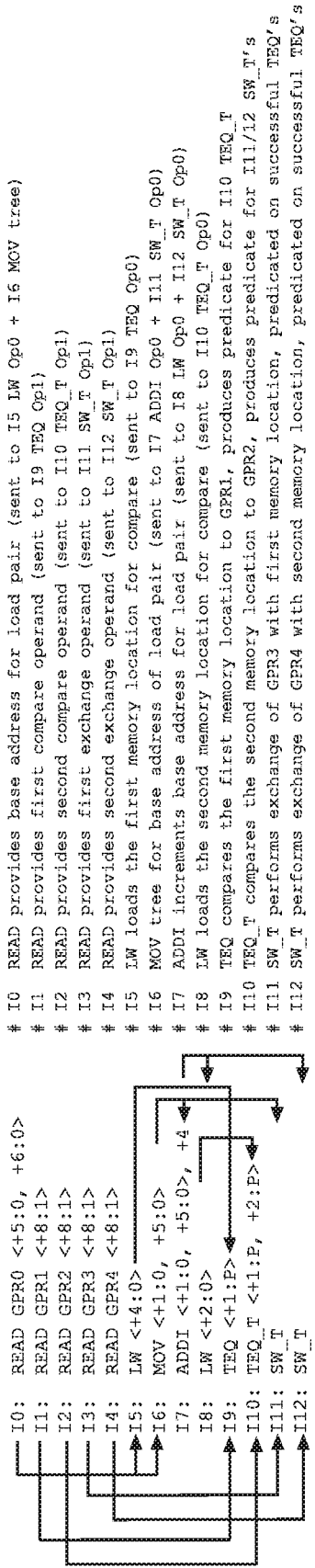

```
I0:  READ GPR0 <+1:Op, +2:Op>   # (0 Op)(0 p)  I0  READ has no operands and no predicate.
I1:  READ GPR1 <+6:Op>          # (0 Op)(0 p)  I1  READ has no operands and no predicate.
I2:  READ GPR2 <+8:Op>          # (0 Op)(0 p)  I2  READ has no operands and no predicate.
I3:  READ GPR3 <+10:Op>         # (0 Op)(0 p)  I3  READ has no operands and no predicate.
I4:  READ GPR4 <+12:Op>         # (0 Op)(0 p)  I4  READ has no operands and no predicate.
I5:  LW <+4:Op>                 # (1 Op)(0 p)  I5  LW has an Op0 (1) and no predicate.
I6:  MOV <+1:Op, +7:Op>         # (1 Op)(0 p)  I6  MOV has an Op0 (2) and no predicate.
I7:  ADDI <+1:Op, +8:Op>, +4    # (1 Op)(0 p)  I7  ADDI has an Op0 (3) and no predicate.
I8:  LW <+3:Op>                 # (1 Op)(0 p)  I8  LW has an Op0 (4) and no predicate.
I9:  TEQ <+1:P>                 # (2 Op)(0 p)  I9  TEQ has an Op0 (5) and Op1 (6) and no predicate.
I10: TEQ_T <+1:P, +2:P>         # (2 Op)(1 p)  I10 TEQ_T has an Op0 (7), Op1 (8), and a predicate (1).
I11: SW_T                       # (2 Op)(1 p)  I11 SW_T has an Op0 (9), Op1 (10), and a predicate (2).
I12: SW_T                       # (2 Op)(1 p)  I12 SW_T has an Op0 (11), Op1 (12), and a predicate (3).
```

FIG. 7B

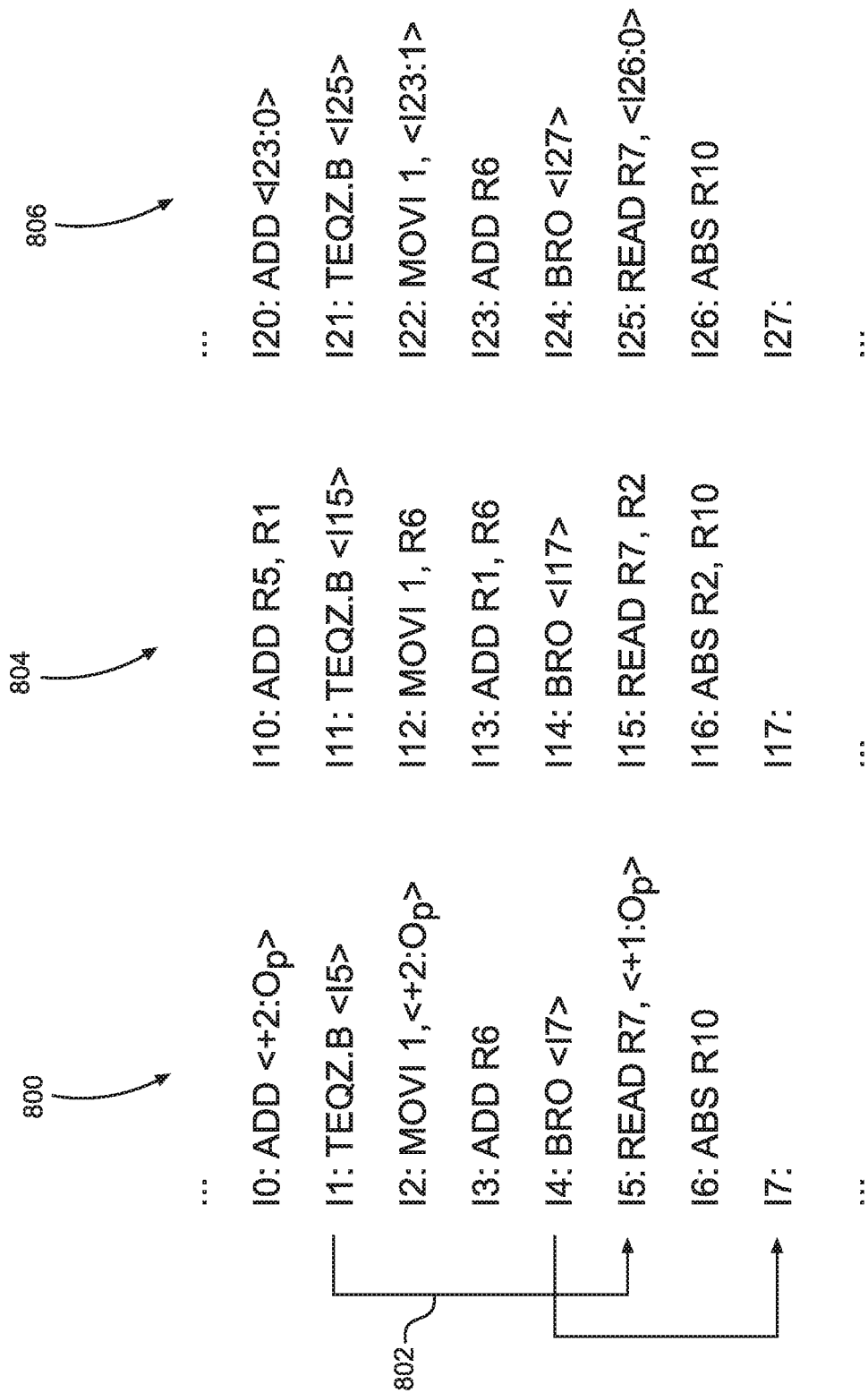

```
...
I0:  READ R0 <+1:Op>, <+4:Op>         // I3, I4
I1:  READ R1 <+2:Op>, <+3:Op>         // I3, I4
I2:  READ R2 <+7:Op>                  // I6 – COMPARED AGAINST 0 FOR THE CONDITIONAL BRANCH
I3:  ADD <+3:Op>, <+6:Op>             // I5, I9 (FOR I6 TAKEN PATH ONLY)
I4:  MUL <+2:Op>, <+5:Op>             // I5, I10 (FOR I6 TAKEN PATH ONLY)
I5:  SUB <+2:Op>                      // I7 (FOR I6 NOT TAKEN PATH ONLY)
I6:  TEQZ.B <I9>                      // CONDITIONALLY BRANCH AROUND HALT
I7:  STORE #100                       // STORE RESULT OF I5
I8:  HALT                             // HALT EXECUTION
I9:  ADDI #3, <+2:Op>                 // ADD 3 TO RESULT OF I3- BUT COULD BE I5 FOR BRANCH TAKEN IN I6
I10: DIVI #5, <+2:Op>                 // DIVIDE RESULT OF I4 BY 5
I11: ADD <+1:Op>
...
```

FIG. 9A

```
902
...
I0: READ R0 <+1:Op>, <+4:Op>
I1: READ R1 <+2:Op>, <+3:Op>
I2: READ R2 <+5:Op>
I3: ADD <+4:Op>, <+7:Op>      // 2ND TARGET CHANGES BECAUSE AN ADDITIONAL INSTRUCTION WAS INSERTED
I4: MUL <+3:Op>, <+6:Op>      // SIMILAR CHANGE TO 2ND TARGET
I5: TNEZ <+1:P>, <+3:Op>      // TEST ONLY, NO BRANCH; USED AS PREDICATE AND AS CONDITION
I6: SUB.T <+2:Op>             // SUB ONLY PRODUCES A VALUE WHEN I5 TEST IS TRUE (WHEN I7 IS NOT TAKEN)
I7: TEQZ.B <I10>              // SAME CONDITIONAL BRANCH – TESTING RESULT OF I5 TEST
I8: STORE #100
I9: HALT
I10: ADDI #3, <+2:Op>
I11: DIVI #5, <+2:Op>
I12: ADD <+1:Op>
...
```

I0: READ R0 <+1:Op>
I1: READ R1 <+2:Op>
I2: ADD <+2:Op>                                                      // I2
I3: READ R2 <+1:Op>                                                  // I2
I4: TEQZ.B <INVALIDATE-ON-TAKEN> <A_FAR_AWAY_LABEL>   // I5, BUT DON'T INFLUENCE FAR AWAY CODE
I5: ABS <+1:Op>                                                      // I4
                                                                     // INVALIDATE EXPLICIT COMM FOR FAR AWAY
```

FIG. 10

OPERAND-BASED REACH EXPLICIT DATAFLOW PROCESSORS, AND RELATED METHODS AND COMPUTER-READABLE MEDIA

FIELD OF THE DISCLOSURE

The technology of the disclosure relates to execution of instructions by a central processing unit (CPU) processor, and more particularly to CPU processors supporting explicit dataflow communications of produced values from a producer instruction to a dependent consumer instruction(s).

BACKGROUND

Microprocessors, also known as "processors," perform computational tasks for a wide variety of applications. A conventional microprocessor includes a central processing unit (CPU) that includes one or more processor cores, also known as "CPU cores," that execute software instructions. The software instructions instruct a CPU to perform operations based on data. The CPU performs an operation according to the instructions to generate a result, which is a produced value. The produced value may then be provided as an output to an I/O device, or made available (i.e., communicated) as an input value to another consumer instruction executed by the CPU. Thus, the consumer instruction is dependent on the produced value produced by the "producer" instruction as an input value to the consumer instruction for execution. These producer and consumer instructions are also referred to collectively as "dependent instructions."

Traditionally, communication between dependent instructions has been done implicitly using the general purpose register (GPR) namespace as a rendezvous point. This communication is termed "implicit," because the producer instruction that produces (i.e., writes) a value into a GPR has no knowledge of which consumer instruction(s) will consume (i.e., read) that produced value. This method of communication can have limitations. As one limitation, the GPR namespace has a finite size, because the names of the consumer instructions are encoded into a finite length instruction. Also, the number of GPRs is generally smaller than the number of values produced by a computation such that multiple produced values must be communicated using the same name of the producer instruction—that is, aliasing occurs within a set of producer instructions and within a set of consumer instructions. Further, because producer instructions have no reference to the consumer instructions for its produced value, there is not a direct way to notify the consumer instruction that the value it will consume has been produced. These concerns have been solved in different ways in modern CPU implementations, but at various costs and tradeoffs associated with the solutions.

An alternative method of communicating between dependent instructions is to explicitly name the consumer instruction and its operand that consumes the produced value in the producer instruction. This is referred to as "explicit" communication. CPUs built on an explicit communication model have been referred to as explicit dataflow graph execution (EDGE) CPUs. Explicit communications address the notification issue of produced values to consumer instructions related to implicit communications. Because the producer instruction directly encodes the name of the consumer instruction and its consuming operand in an explicit communications model, a produced value generated from the producer instruction can be provided (e.g., forwarded) to an operand of a named consumer instruction.

One issue that may still be present in such explicit communications is the size allocated to encoding a consumer name and operand of a consumer instruction in a producer instruction. The number of bits allocated to encoding a consumer in a producer instruction (i.e., the consumer namespace) must be sufficient to name the possible consumer instructions based on the design. Also, a sufficient number of bits must allocated in the consumer namespace to encode all possible operands of a targeted consumer instruction even if the actual named consumer instruction in a producer instruction has less operands. For example, if a consumer instruction calls for five (5) operands, all producer instructions that are allowed to target such consumer instruction must allocate a sufficient number of bits in its consumer namespace to encode five (5) operands even if the actual named consumer instruction has fewer operands. Providing an instruction format that allows a larger consumer namespace bit size for naming a consumer instruction and its consuming operand provides greater flexibility in explicit naming of consumer instructions, but also consumes a larger amount of memory space for storage of instructions. Conventional EDGE processors have addressed the size of explicit consumer instruction naming by partitioning the dataflow graph of the full computation into pieces, sometimes referred to as instruction blocks, with explicit consumer naming being based on the start of the instruction block. The EDGE processors are designed to employ an execution model that explicitly communicates produced values to consumer instructions within the same block-local namespace so that the maximum number of instructions in a block is determined and limited by the size of the name that can be encoded in an instruction.

Thus, while an EDGE processor has the advantage of reduced complexity relative to an implicit communication model, an EDGE processor has a disadvantage of being limited in explicit communication of produced values to consumer instructions in the same instruction block. Further, since consumer names are only valid within a given instruction block, there is an issue with communicating produced values internal to an instruction block across block boundaries. Previous EDGE CPUs use implicit communication (either via the memory namespace or the GPR namespace) to communicate produced values externally across instruction block boundaries. Although inter-block communication is less frequent than intra-block communication for reasonable block sizes, the use of implicit communication dilutes the advantages of explicit communications for dependent instructions. Constraining instruction blocks to have a maximum size also places a burden on the programmer or compiler, which must decide which instructions are best placed in each instruction block based on communication patterns between dependent instructions and the associated costs.

SUMMARY

Exemplary aspects disclosed herein include operand-based reach explicit dataflow processors, and related methods and computer-readable media. The operand-based reach explicit dataflow processors are configured to support execution of producer instructions that allow operand-based reach explicit consumer naming. In this regard, the producer instructions can be encoded with explicit naming of consumer operands intended to consume the values produced by the producer instructions. In exemplary aspects disclosed herein, the operand-based reach explicit dataflow processors support execution of a producer instruction that explicitly names (i.e., encodes) a target consumer operand of a consumer instruction in a consumer operand encoding namespace ("operand reach namespace") of the producer instruction. The produced value from execution of the producer instruction is provided or otherwise made available as an input to the named target consumer operand of the consumer instruction as a result of processing the encoded producer instruction. The target consumer operand is encoded in an operand reach namespace of the producer instruction as an "operand target distance" relative to the producer instruction as a reference point. The operand target distance is a distance of the number of operands away that the targeted consumer operand is from the producer instruction in the instruction stream. In other words, the operand target distance is the number of operands consumed between the producer instruction and the targeted consumer operand of the targeted consumer instruction. For example, if a consumer operand of a target consumer instruction is the fifth operand to be consumed following the producer instruction, the producer instruction can name the target consumer operand by encoding a target operand offset of five (5) in the producer instruction without having to also name the consumer instruction in the producer instruction. The maximum operand target distance allowed by the operand-based reach explicit dataflow processor is referred to as the "reach" of the processor.

In this manner, as an example, instructions in an instruction stream between the producer instruction and the targeted consumer instruction that have no operands do not consume the operand reach namespace in the producer instructions. The encoding of the consumer operand target distance inherently skips instructions with no operands. This provides for a deeper explicit consumer naming reach for a given bit size of the operand reach namespace. Also, as another example, if a consumer instruction is added to an instruction set architecture (ISA) supported by an operand-based reach explicit dataflow processor that calls for additional operands greater than any of the current consumer instructions, the operand reach namespace does not have to be expanded for all producer instructions to accommodate the explicit consumer naming. This is because the encoded operand target distance is not based on naming a consumer operand position within a particular consumer instruction. If the consumer naming were based on the name of the consumer instruction and a consumer operand position within the consumer instruction, the consumer encoding namespace for each producer instruction would have to be sized to accommodate the maximum number of consumer operand positions possible even though a given producer instruction may name a consumer instruction having fewer operands. Thus, the operand-based reach explicit consumer naming may enable instructions in an ISA with a larger operand count without having to unduly increase the consumer namespace in the producer instructions. As an example, supporting instructions with larger operand counts may avoid the need to provide for special opcodes in an ISA that will be recognized by a processor to be processed in a fused manner as an atomic package for a lower maximum operand count per instruction.

Also, as another example, operand-based reach explicit consumer naming does not require instructions to be grouped in instruction blocks to support a fixed block reference point for explicit naming of consumer instructions, and thus limited to explicit naming of consumer instructions only within the instruction block of the producer instruction.

Thus, removing the architectural limitation of instruction blocks in a dataflow processor can allow the dataflow processor to be designed to support explicit dataflow communications over larger computation graphs that are not limited by instruction block size. Operand-based reach explicit consumer naming may also have the advantage of requiring less operand reach namespace since consumer operand naming is relative to the location of the producer instruction rather than a fixed reference location that may frequently be farther away from the targeted consumer operand.

In other exemplary aspects disclosed herein, the operand target distance of the consumer operand named by a producer instruction is encoded in an operand reach namespace of a producer instruction as an operand target distance. The bit size chosen for the operand reach namespace defines maximum operand target distance, or reach, of the set of consumer operands that a producer instruction can explicitly communicate with directly. The bit size of the operand reach namespace for a specific architecture is a design decision determined by the desired tradeoff between the instruction memory size needed to store a given number of instructions that includes bits allocated to encode the operand reach namespace and the operand reach namespace desired. The operand-based reach explicit dataflow processor can also support use of an intermediate consumer operand(s) named by a producer instruction for indirect naming of a consumer operand if the target consumer operand is beyond the operand reach of the producer instruction. In this regard, the consumer instruction of the intermediate named consumer operand(s) can name another consumer operand(s) that can name the ultimate intended consumer operand in a consumer instruction to provide the produced value to the ultimate intended consumer operand. Further, the operand-based reach explicit producer/consumer communications do not preclude the ability of the operand-based reach explicit dataflow processor to support implicit producer/consumer communications if the operand target distance is larger than the operand reach value and, for example, a programmer or compiler does not deem it desired to use intermediate consumer operands/instructions.

In this regard, in one exemplary aspect, a processor is provided. The processor is configured to receive a plurality of instructions in an instruction stream from an instruction memory to be executed, the plurality of instructions comprising a plurality of producer instructions and a plurality of consumer instructions. The processor is further configured to dispatch a consumer instruction among the plurality of consumer instructions to be executed in response to an operand of the consumer instruction being available. The processor is further configured to execute a producer instruction among the plurality of producer instructions to generate a produced value, the producer instruction configured to include an explicit consumer operand name comprising an operand target distance representing a relative operand distance in the instruction stream from the producer instruction, and determine if the executed producer instruction includes an explicit consumer operand name. In response to determining the executed producer instruction includes an explicit consumer operand name, the processor is further configured to write the produced value of the executed producer instruction to the operand of the consumer instruction identified an operand distance away from the producer instruction in the instruction stream by the operand target distance in the explicit consumer operand name of the executed producer instruction.

In another exemplary aspect, a method of providing a produced value from a producer instruction executed by a processor as an input to an operand of a consumer instruction based on an explicit naming of the consumer operand in the producer instruction is provided, the method comprising receiving a plurality of instructions in an instruction stream from an instruction memory to be executed, the plurality of instructions comprising a plurality of producer instructions and a plurality of consumer instructions. The method further comprises executing a producer instruction among the plurality of producer instructions to generate a produced value, the producer instruction configured to include an explicit consumer operand name comprising an operand target distance representing a relative operand distance in the instruction stream from the producer instruction. The method further comprises determining if the executed producer instruction includes an explicit consumer operand name. In response to determining the executed producer instruction includes an explicit consumer operand name, the method further comprises storing the produced value of the executed producer instruction to an operand of the consumer instruction identified an operand distance away from the producer instruction in the instruction stream by the operand target distance in the explicit consumer operand name of the executed producer instruction, and dispatching a consumer instruction among the plurality of consumer instructions to be executed in response to the operand of the consumer instruction being stored.

In another exemplary aspect, a non-transitory computer-readable medium having stored thereon an instruction program comprising a plurality of computer executable instructions for execution by a processor is provided, the plurality of computer executable instructions comprising a producer instruction comprising an instruction type and an explicit consumer operand name comprising an operand target distance representing a relative operand distance in the instruction program from the producer instruction. The plurality of computer executable instructions further comprises a consumer instruction comprising an instruction type and an operand, the operand of the consumer instruction being an operand distance away from the producer instruction in the instruction program by the operand target distance in the explicit consumer operand name of the producer instruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 2A illustrates an exemplary producer instruction coded with an instruction data format that includes operand-based reach explicit consumer namespace for encoding one or more consumer operands of a consumer instruction identified to consume the value produced by the producer instruction;

FIG. 2B illustrates an exemplary instruction data format for the producer instruction in FIG. 2A;

FIG. 3A is an exemplary instruction stream of computer instructions encoded with an operand-based reach explicit consumer naming and configured to be processed by an operand-based reach explicit dataflow processor;

FIG. 3B is an exemplary instruction stream of computer instructions encoded with an instruction-based reach explicit consumer naming to perform the same function as the instruction stream in FIG. 3A;

FIG. 3C is another exemplary instruction stream of computer instructions encoded with an operand-based reach explicit consumer and that includes an instruction that names different target operands for consuming distinctly produced values;

FIG. 4A is another exemplary instruction stream of computer instructions encoded with an instruction-based reach explicit consumer naming and including fusion instructions to manufacture instructions with more than two operands;

FIG. 4B is an exemplary instruction stream of computer instructions encoded with an operand-based reach explicit consumer naming supporting naming of more than two consumer operands in a producer instruction and allowing for the replacement of the fusion instructions in the instruction stream in FIG. 4A with an instruction having five (5) operands;

Figure 5:
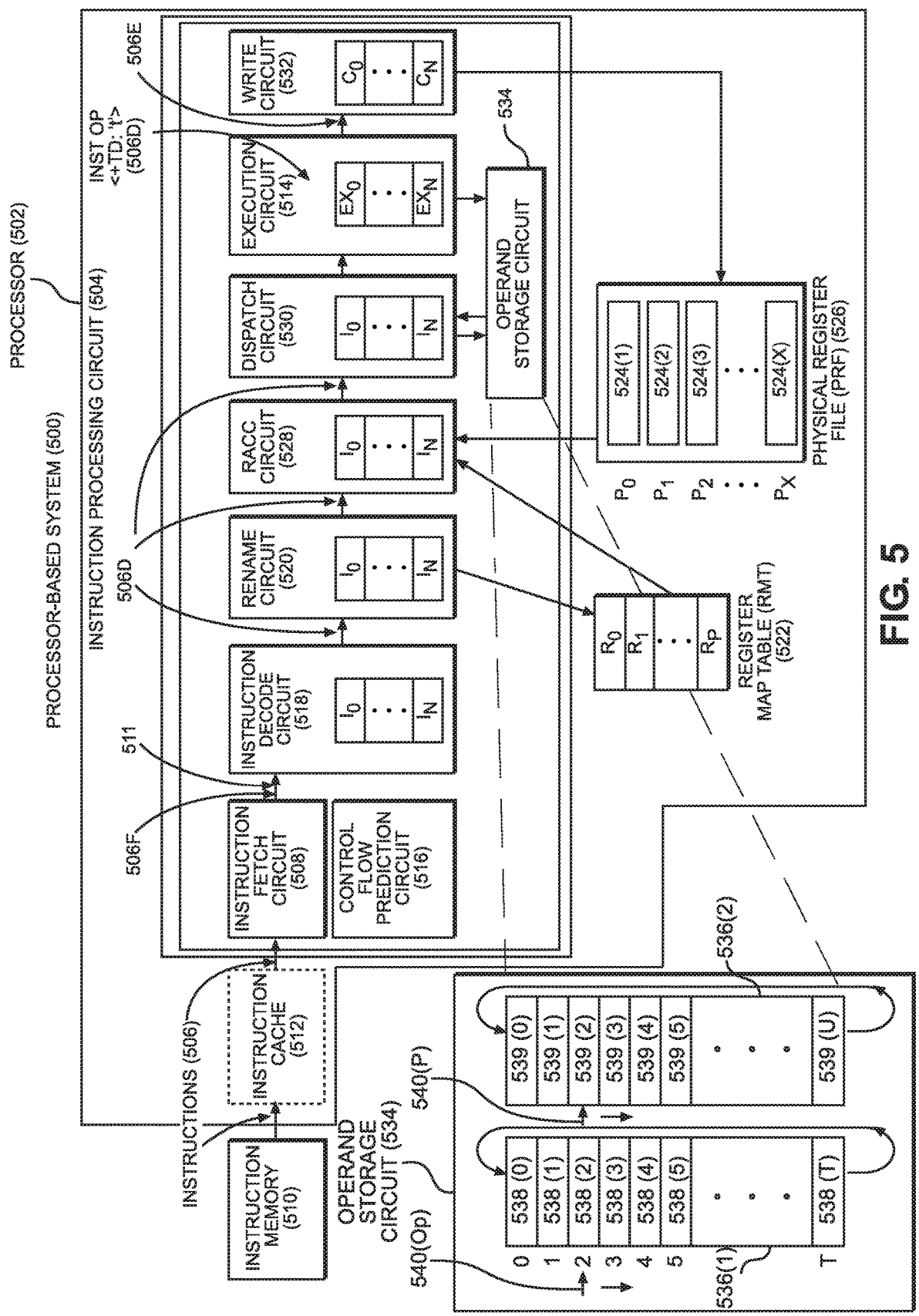
Figure 6:
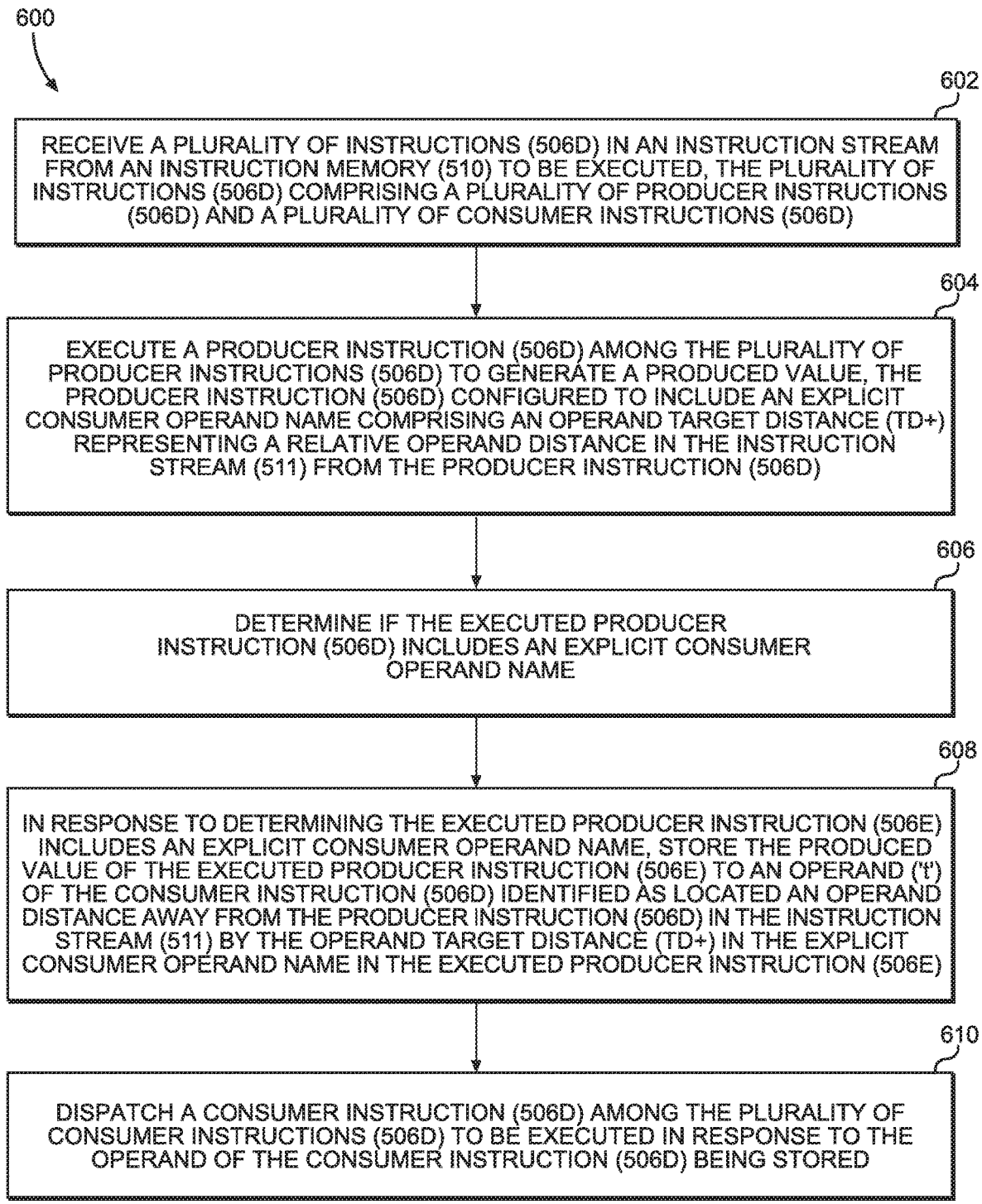
Figure 11:
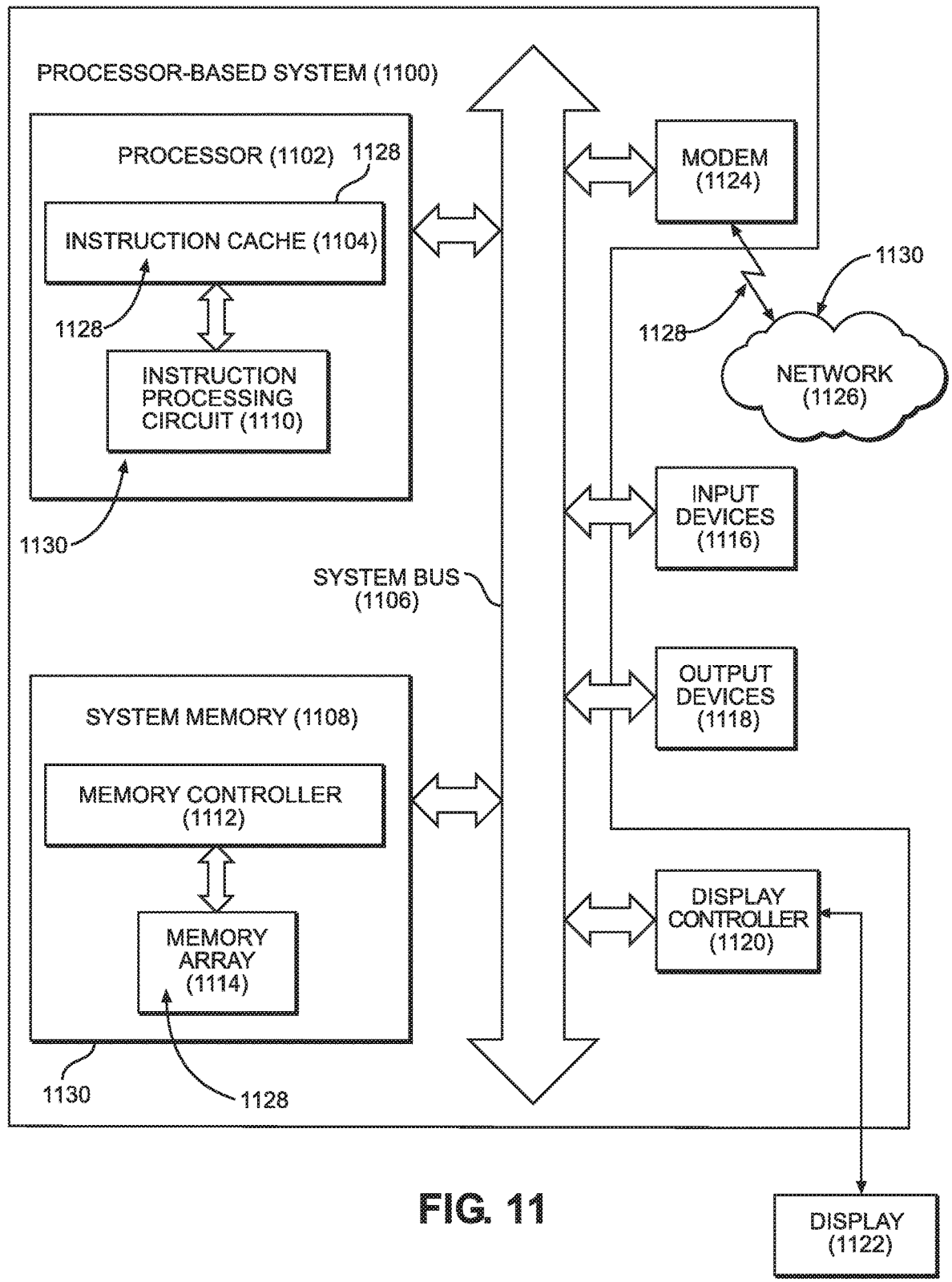

FIG. 5 is a schematic diagram of an exemplary processor-based system that includes an operand-based reach dataflow processor configured to support execution of producer instructions encoded with operand-based reach explicit consumer naming, to provide produced values from the executed producer instructions for consumption by named operands of consumer instructions identified by operand-based explicit consumer naming;

FIG. 6 is a flowchart illustrating an exemplary process of an operand-based reach explicit dataflow processor, such as the operand-based based explicit dataflow processor in FIG. 5, communicating produced values from executed producer instructions to be consumed by named operands of consumer instructions identified by operand-based reach explicit consumer naming in the executed producer instruction;

FIG. 7A is another exemplary instruction stream of computer instructions encoded with an instruction-based reach explicit consumer naming and configured to be processed by an instruction-based reach explicit dataflow processor;

FIG. 7B is an exemplary instruction stream of computer instructions encoded with an operand-based reach explicit consumer naming and configured to be processed by an operand-based reach explicit dataflow processor to perform the same function as the instruction stream in FIG. 7A;

FIG. 8A is an exemplary instruction stream of computer instructions encoded with an operand-based reach explicit consumer naming and configured to be processed by an operand-based reach explicit dataflow processor, wherein the instruction listing includes a branch instruction creating a write-after-write (WAW) hazard and includes a WAW instruction after the branch instruction to resolve the WAW hazard;

FIGS. 8B and 8C illustrate other exemplary instruction streams that allow a processor to perform the same operations as provided in the instruction stream in FIG. 8A based on implicit consumer naming and explicit consumer naming in an instruction block architecture, respectively;

FIG. 9A is an exemplary instruction stream of computer instructions encoded with operand-based reach explicit consumer naming and configured to be processed by an operand-based reach explicit dataflow processor, wherein the instruction listing includes a WAW hazard due to a branch instruction and does not include an intermediate WAW instruction to resolve the WAW hazard;

FIG. 9B is an exemplary instruction stream of the computer instructions in FIG. 9A, wherein the instruction stream resolves the WAW hazard by predicating an instruction creating the WAW hazard based on a branch not being taken;

FIG. 10 is an exemplary instruction stream of computer instructions encoded with operand-based reach explicit consumer naming and configured to be processed by an operand-based reach explicit dataflow processor, wherein the instruction listing includes a branch instruction that is encoded to cause an operand-based reach explicit dataflow processor to invalidate a produced value when a branch is taken to resolve a WAW hazard; and FIG. 11 is a block diagram of an exemplary processor-based system that includes an operand-based reach explicit dataflow processor, including but not limited to the operand-based reach dataflow processor in FIG. 5, and configured to support execution of producer instructions encoded with operand-based reach explicit naming of consumer operands in consumer instructions intended to consume the values produced by the producer instructions.

DETAILED DESCRIPTION

Exemplary aspects disclosed herein include operand-based reach explicit dataflow processors, and related methods and computer-readable media. The operand-based reach explicit dataflow processors are configured to support execution of producer instructions that allow operand-based reach explicit consumer naming. In this regard, the producer instructions can be encoded with explicit naming of consumer operands intended to consume the values produced by the producer instructions. In exemplary aspects disclosed herein, the operand-based reach explicit dataflow processors support execution of a producer instruction that explicitly names (i.e., encodes) a target consumer operand of a consumer instruction in a consumer operand encoding namespace ("operand reach namespace") of the producer instruction. The produced value from execution of the producer instruction is provided or otherwise made available as an input to the named target consumer operand of the consumer instruction as a result of processing the encoded producer instruction. The target consumer operand is encoded in an operand reach namespace of the producer instruction as an "operand target distance" relative to the producer instruction as a reference point. The operand target distance is a distance of the number of operands away that the targeted consumer operand is from the producer instruction in the instruction stream. In other words, the operand target distance is the number of operands consumed between the producer instruction and the targeted consumer operand of the targeted consumer instruction. For example, if a consumer operand of a target consumer instruction is the fifth operand to be consumed following the producer instruction, the producer instruction can name the target consumer operand by encoding a target operand offset of five (5) in the producer instruction without having to also name the consumer instruction in the producer instruction. The maximum operand target distance allowed by the operand-based reach explicit dataflow processor is referred to as the "reach" of the processor.

In this manner, as an example, instructions in an instruction stream between the producer instruction and the targeted consumer instruction that have no operands do not consume the operand reach namespace in the producer instructions. The encoding of the consumer operand target distance inherently skips instructions with no operands. This provides for a deeper explicit consumer naming reach for a given bit size of the operand reach namespace. Also, as another example, if a consumer instruction is added to an instruction set architecture (ISA) supported by an operand-based reach explicit dataflow processor that calls for additional operands greater than any of the current consumer instructions, the operand reach namespace does not have to be expanded for all producer instructions to accommodate the explicit consumer naming. This is because the encoded operand target distance is not based on naming a consumer operand position within a particular consumer instruction. If the consumer naming were based on the name of the consumer instruction and a consumer operand position within the consumer instruction, the consumer encoding namespace for each producer instruction would have to be sized to accommodate the maximum number of consumer operand positions possible even though a given producer instruction may name a consumer instruction having fewer operands. Thus, the operand-based reach explicit consumer naming may enable instructions in an ISA with a larger operand count without having to unduly increase the consumer namespace in the producer instructions. As an example, supporting instructions with larger operand counts may avoid the need to provide for special opcodes in an ISA that will be recognized by a processor to be processed in a fused manner as an atomic package for a lower maximum operand count per instruction.

Figure 1:
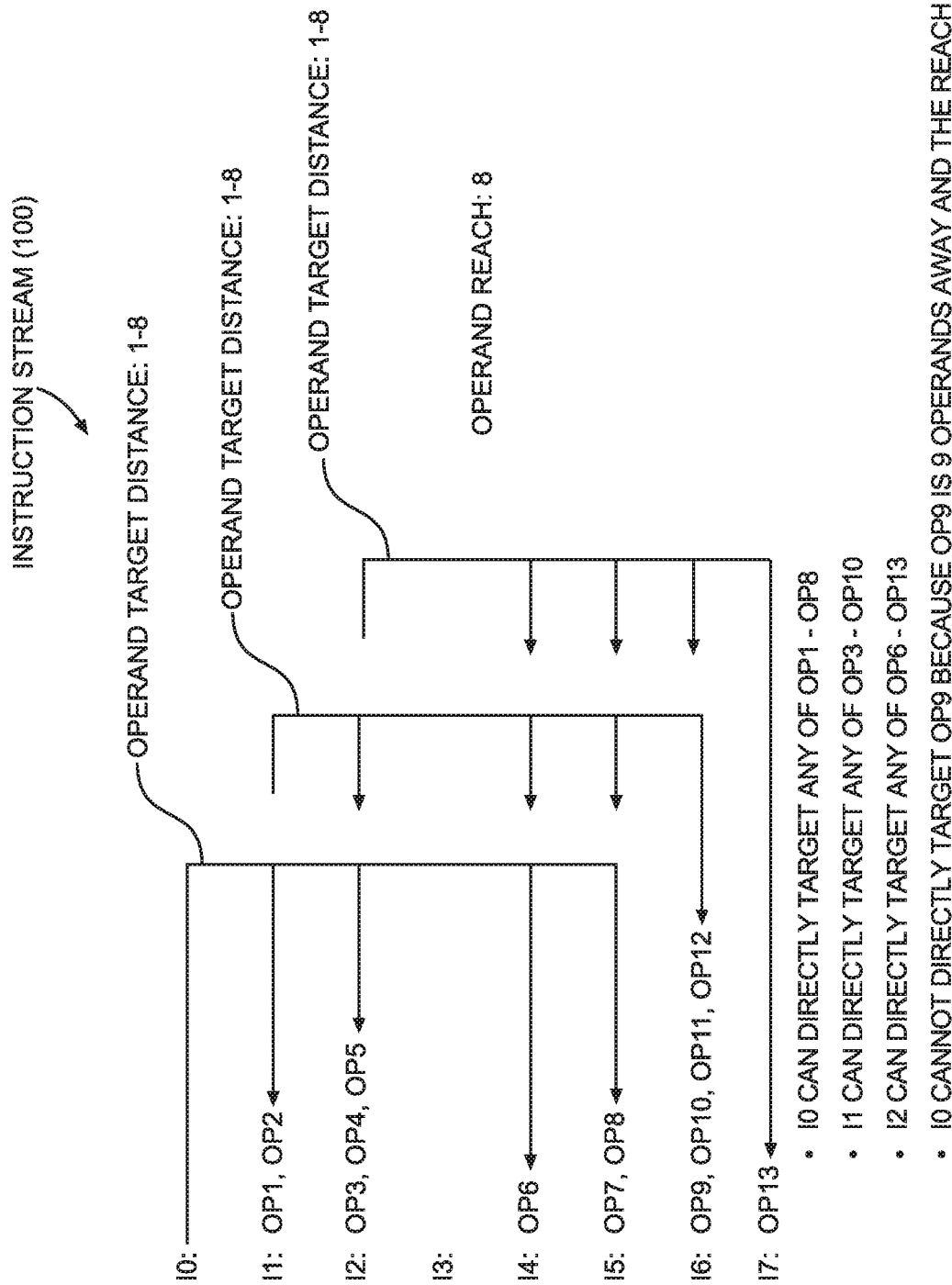
FIG. 1 is an exemplary list of computer instructions to illustrate possibilities of an operand-based reach explicit dataflow processor supporting operand-based reach explicit consumer naming of consumer operands in a producer instruction based on an operand reach of eight (8)

In this regard, FIG. 1 is an exemplary instruction stream 100 fetched from an instruction program stored in computer memory that includes a series of computer instructions I0-I7 to be executed by a processor to illustrate an example of an operand-based reach explicit consumer communication model of explicit naming of an intended consumer operand within a producer instruction. A producer instruction is an instruction that when executed by a processor, generates a produced value according to the instruction type and operand(s) of the producer instruction. This produced value may then be provided as an output value to an I/O device, or made available (i.e., communicated) as an input value in a designated operand to another consumer instruction in an instruction stream executed in the processor. Thus, a consumer instruction that uses (i.e., consumes) a produced value generated by executing a producer instruction is dependent on the producer instruction. Dependent instructions are used in both in-order and out-of-order processors. For example, if instruction I2 in the instruction stream 100 in FIG. 1 consumes a produced value generated by execution of instruction I0 in a processor, instruction I2 would be a consumer instruction to the producer instruction I0, thus creating a producer-consumer dependency between instructions I0 and I2. Communications of produced values between dependent instructions can be done implicitly in an implicit communications model using a general purpose register (GPR) namespace as a rendezvous point. However, an implicit communications model can have limitations due to a finite size of GPR namespace and because there is not a direct way for a producer instruction to notify the consumer instructions that its produced value has been produced.

In this regard, as discussed in more detail below, the operand-based reach explicit consumer communications model disclosed herein for use by processors in communicating produced values from producer instructions to consumer instructions during execution is a "reach" based explicit consumer communications model. In this model, a processor is configured to process instructions with a supported instruction format that includes the ability of a producer instruction to explicitly name (i.e., encode) within the producer instruction an intended consumer operand in a dependent consumer instruction(s). This explicit consumer operand naming provides a notification that is recognized during execution by a processor supporting the operand-based reach explicit consumer communications model to communicate a produced value from a producer instruction to the named target consumer operand in a consumer instruction for consumption. In an explicit dataflow communications model, a method is needed to encode the identification of the intended consumer operand in the producer instruction. In examples of the operand-based reach explicit consumer communications model disclosed herein, the explicit naming of the consumer operand within a producer instruction is based on encoding an operand "target distance" in an operand reach namespace of the producer instruction. In examples discussed herein, the operand target distance is an offset of the number of operands away the targeted consumer operand is from the producer instruction in the instruction stream. In other words, in this example, the operand target distance is the number of operands consumed by executing the instructions in the instruction stream between the producer instruction and the targeted consumer operand of the targeted consumer instruction. This is shown by example in the instruction stream 100 in FIG. 1 discussed now.

The instruction stream 100 in FIG. 1 is based on an operand-based reach explicit dataflow processor having an operand "reach" (i.e., maximum operand target distance) of eight (8) operands. This means that any instruction I0-I7 in the instruction stream 100 is capable of explicitly naming a consumer operand within eight (8) later consumed operands after the producer instruction in the instruction stream 100. For example, instruction I0 as a producer instruction can name a consumer operand in any of instructions I1-I5 as consumer instructions, because eight (8) consumer operands OP1-OP8 are present in instructions I1-I5 that follow instruction I0, and the operand reach is eight (8) in this example. Similarly, as shown in FIG. 1, instruction I1 as a producer instruction can name a consumer operand in any of instructions I2-I5 and consumer operands OP9 and OP10 in instruction I6, respectively, as consumer instructions with a specified operand reach of eight (8). However, in the instruction stream 100 example in FIG. 1, instruction I0 cannot directly target a consumer operand in instructions I6 and beyond, because the operands OP1-OP8 are consumed between the instruction I0 and instruction I6. The operands in instruction I6 of OP9-OP12 are nine (9) to twelve (12) consumed operands away from instruction I0, beyond the maximum operand reach of eight (8) in this example. However, instruction I0 could indirectly target the consumer operands in instruction I6 by naming a consumer operand in one of intermediate instructions I1-I5 as a consumer and then that intermediate instruction naming a consumer operand in instruction I6 as an ultimate consumer. Implicit dataflow communications can be employed to target consumer operands having a greater target distance from a producer instruction than the operand reach.

In this manner, as an example, this operand-based reach explicit consumer communications model does not require instructions to be grouped in instruction blocks that support a fixed block reference point for explicit naming of consumer instructions or operands. Thus, the operand-based reach explicit consumer communications model is not limited to a producer instruction explicitly naming a consumer instruction or operand only within its same instruction block. Removing the architectural limitation of instruction blocks in a dataflow processor can allow the dataflow processor to be designed to support explicit dataflow communications over larger computation graphs that are not limited by instruction block size. Each producer instruction in an operand-based reach explicit consumer communications model is capable of having a private set of consumer operands, which allows an unlimited number of consumer operands to be named (i.e., reached) in an instruction stream, and thus a computation graph over the entire instruction stream, if desired.

However, the allocated bits in the supported operand reach namespace will control the maximum operand target distance that can be encoded in a producer instruction and processed by a compatible processor. The bit size of the operand reach namespace is a design decision determined by the desired tradeoff of increased instruction encoding size resulting from allocation of sufficient bits in the operand reach namespace in all instructions to encode the operand reach versus the desired operand reach of the system. For example, an operand reach of eight (8) may require a minimum of three (3) bits to encode the operand target distance, whereas an operand reach of sixteen (16) may require a minimum of four (4) bits to encode the operand target distance. Regardless, operand-based explicit consumer naming has the advantage of requiring less operand reach namespace over block-atomic execution models, since consumer operand naming is relative to the producer instruction rather than a fixed reference that may frequently be farther away from the consumer operand.

FIG. 2A illustrates an exemplary operand-based reach explicit consumer naming instruction format 200 ("instruction format 200") for a producer instruction 202 that includes an operand reach namespace for encoding one or more target consumer operands according to an exemplary operand-based reach explicit naming instruction set architecture (ISA). FIG. 2B illustrates an example of an ADD producer instruction 204 encoded with the instruction format 200 of the producer instruction 202 in FIG. 2A to explicitly name a consumer operand based on an operand target distance with the operand reach. A processor that is compatible with an operand-based reach explicit consumer communications model and instruction format 200 in FIG. 2A will communicate the produced value resulting from execution of the producer instruction 202 to the named consumer operand(s).

In this example, as shown in FIG. 2A, the instruction format 200 has an instruction type INST. For example, an instruction type of an addition instruction type is shown as the ADD producer instruction 204 in FIG. 2B. Further, as shown in FIG. 2A, the instruction format 200 also includes an operand OP that provides an input operand for the producer instruction 202. For example, the operand in the ADD producer instruction 204 in FIG. 2B is register R1. Note that an operand may not be required if previous producer instructions in an instruction stream of computer executable instructions targeted the ADD producer instruction 204 as a consumer of its produced values.

As also shown in FIG. 2A, the instruction format 200 also includes an operand reach namespace 206(1) to encode one or more targeted consumer operands in the producer instruction 200. In the example shown in FIG. 2B, two named consumer operands 208(1), 208(2) are encoded in the operand reach namespace 206(2) of the ADD producer instruction 204 that are each identified by a notation pair <+TD:'t'> as shown also shown FIG. 2A, wherein "+TD" is operand target distance, and 't' is the operand type in the set of {Op, P} in this example. As shown in FIG. 2A, '+TD' in the operand reach namespace 206(1) of the instruction format 200 indicates a relative operand target distance offset of the targeted consumer operand from a producer instruction in an instruction stream. Also in this example, 't' in the operand reach namespace 206(1) of the instruction format 200 indicates the type of operand that the producer instruction is naming for a processor to pass (e.g., reserve for) its produced value. For example, a 't' value of 'Op' means a consumer data operand for a consumer data instruction, whereas 'P' means a predicate operand for a consumer predicate instruction that includes a predicate condition to be evaluated. Thus, the interpretation of operand reach namespace 206(1)<+TD:'t'> is that the produced value from the producer instruction should be delivered to the consumer operand 'TD' that is located at a consumer operand offset forward from the producer instruction in the instruction stream, and the produced value is used as operand type 't' in the consumer operand.

Thus for example, as shown in the ADD producer instruction 204 in FIG. 2B, a first named consumer operand is provided as <+3:Op>, meaning the produced value from execution of the ADD producer instruction 204 is to be communicated as a data operand to a consumer operand within a consumer data instruction that is forward offset three (3) consumer data operands away from the producer instruction 204 in an instruction stream. In other words, the targeted consumer operand provided by the notation <+3: Op> in the operand reach namespace 206(2) of the ADD producer instruction 204 identifies a target consumer operand that will be consumed three data operands forward of the ADD producer instruction 204 in an instruction stream. Also as shown in the ADD producer instruction 204 in FIG. 2B, a second named consumer is provided as <+8:P>, meaning the produced value from execution of the ADD producer instruction 204 is also to be communicated as a predicate operand to a consumer operand within a consumer predicate instruction that is forward offset eight (8) consumer predicate operands away from the producer instruction 204 in an instruction stream. If the maximum operand reach is eight (8), three (3) bits can be provided in the instruction format 200 to encode the target distance '+TD.' If the maximum number of operand types is two (2), one (1) bit can be provided in the instruction format 200 to encode the operand type 't.'

To further illustrate the reach-based explicit consumer communications model, FIG. 3A is provided to illustrate an exemplary instruction stream 300 of computer executable instructions I0-I2 that is configured to be executed by an operand-based explicit dataflow processor to perform operand-based reach explicit communication of produced values to named consumer operands in consumer instructions. As shown in FIG. 3A, instruction I0 is a READ instruction that includes source register 'GPR0' (general purpose register 0) as an input and an explicitly named (i.e., targeted) consumer data operand 0 in instruction I2 at a forward operand target distance of '+1' from the instruction I0 to receive the produced value from instruction I0. Operand 0 in instruction I2 is located one (1) operand away from instruction I0 and is thus encoded with an operand target distance of '+1,' because intermediate instruction I1 has no input operands. Similarly, instruction I1 is a READ instruction that includes source register 'GPR1' (general purpose register 1) as an input and an explicitly named consumer data operand 1 in instruction I2 at a forward operand target distance of '+2' from the instruction I1 to receive the produced value from instruction I1. Operand 1 in instruction I2 is located two (2) operands away from instruction I1 and is thus encoded with an operand target distance of '+2,' because of intermediate operand 0 in instruction I2 being located one (1) operand away from instruction I1.

For comparison purposes, FIG. 3B illustrates an exemplary instruction stream 302 of computer executable instructions I0-I2 encoded with an alternative "instruction-based" reach encoding, as opposed to "operand-based," and configured to be executed by an instruction-based reach explicit dataflow processor. The instructions I0-I2 in FIG. 3B encoded with an alternative instruction-based reach encoding are designed to perform the same functions as instruction stream 300 when executed by an instruction-based reach explicit dataflow processor. As shown in FIG. 3B, instruction I0 in instruction stream 302 is a READ instruction that includes source register 'GPR0' (general purpose register 0) as an input and an explicitly named (i.e., targeted) operand 0 of a consumer instruction at a forward operand target distance of '+2' from instruction I0 based on an instruction reach namespace encoding of <+2:0>. '+2' indicates a consumer instruction two instructions forward, and '0' indicates operand 0. This instruction reach namespace encoding instructs the processor to pass or otherwise make available the produced value from the execution of instruction I0 to operand 0 of instruction I2 located two (2) instructions below instruction I0. Similarly, instruction I1 in instruction stream 302 is a READ instruction that includes source register 'GPR1' (general purpose register 1) as an input and an explicitly named consumer operand 1 of a consumer instruction at a forward operand target distance of '+1' from the instruction I1 to receive the produced value from instruction I1. This signifies to the processor to pass or otherwise make available the produced value from the execution of instruction I1 to operand 1 of instruction I2 located one (1) instruction below instruction I1.

Note that the instruction reach namespace encoding of <+2:0> in instruction I0 in the instruction stream 302 in FIG. 3B requires identifying the location consumer instruction by a forward operand target distance, which is '+2' in this example. Thus, the forward operand target distance accounts for all intermediate instructions between the producer instruction and its targeted consumer instruction. This means that the direct consumer instruction targeted by a producer instruction in the instruction stream 302 cannot be at a greater distance away than the instruction reach. Thus, intermediate instructions in the instruction stream 302 between the producer instruction and targeted consumer instruction limit the reach in the instruction-based reach explicit consumer naming model in FIG. 3B. However, in an operand-based reach explicit consumer naming model like in FIG. 3A, the encoding of the consumer operand target distance allows an arbitrary number of operands in the ISA. The operand reach namespace inherently skips instructions with no operands, because the location of the consumer instruction does not have to be identified. This can provide for a deeper explicit consumer naming reach for a given bit size of the operand reach namespace in an operand-based reach explicit consumer naming model. This is because in an operand-based reach explicit consumer naming model, the directly named consumer operand in a producer instruction is not limited to a targeted consumer instruction being a particular distance from the producer instruction, but rather is only limited by the number of intervening operands between the producer instruction and the named consumer operand. In an instruction-based reach explicit consumer naming model like in FIG. 3B, the directly named consumer instruction in a producer instruction is limited to being no further away from the producer instruction than the instruction reach.

Also note that in the instruction-based reach explicit consumer naming model in the instruction stream 302 in FIG. 3B, the instruction reach namespace encoding of <+2:0> in instruction I0 and <+1:1> in instruction I1 requires that the operand numbers (i.e., operands '0' and '1') be encoded in addition to identifying the forward consumer instruction. Thus, if a consumer instruction were added to an instruction set architecture (ISA) supported by an instruction-based reach explicit dataflow processor that calls for additional operands beyond two (2) operands (i.e. operands 0 and 1), the instruction reach namespace would have to be expanded to allocate additional bits to name additional operands (e.g., operand 2, 3, . . . ) for all producer instructions. Alternatively, fused instructions may be employed to effectively create instructions that have more than two (2) operands. This is because the encoded instruction target distance is based on naming a consumer operand position within a particular named consumer instruction. Thus, the instruction reach namespace for each producer instruction would have to be sized to accommodate the maximum number of consumer operand positions possible, even though a given producer instruction may name a consumer instruction having fewer operands. In contrast, as shown in the example instruction stream 300 in FIG. 3A, operand-based reach explicit consumer naming only encodes an operand target distance without discerning operand position within a consumer instruction. Thus, the operand reach namespace for each producer instruction would not have to be resized to accommodate the added instructions with additional consumer operands. Only the operand reach size affects the bits allocated to the operand reach namespace to identify the target consumer operand.

FIG. 3C is another exemplary instruction stream 304 of computer instructions encoded with an operand-based reach explicit consumer naming model and that includes an instruction that names different target operands for consuming distinctly produced values. In this example, instruction I0 (READ) names a '+1' operand for the data value stored at the memory address in GPR0 to be consumed by operand 0 in instruction I2. Instruction I1 (READ) names a '+3' operand for the data value stored at the memory address in GPR1 to be consumed by operand 0 in instruction I4. Instruction I2 (LDP) loads a pair of data values with the first produced value named to the target operand of '+1,' which will be operand 0 in instruction I3, and a second distinct produced value named to target operand '+3,' which will be operand 1 in instruction I4.

As discussed above, an operand-based reach explicit consumer naming model can eliminate the need for fused instructions to effectively provide instructions with more operands than can be encoded in an instruction reach namespace of an instruction-based reach explicit consumer naming model. This is shown by example in the instructions streams 400 and 402 of computer executable instructions in FIGS. 4A and 4B, respectively. The instruction stream 400 in FIG. 4A has instructions I0-I5 encoded based on an instruction-based reach explicit consumer naming. The instruction stream 400 includes fusion instructions I3-I5 to manufacture instructions to create an instruction with effectively more than two (2) operands. The instruction reach namespace in the instruction stream 400 in FIG. 4A only supports the naming of two (2) operand positions: operand '0' and operand '1', like those explained above in the example in FIG. 3B. However, the instruction stream 402 of computer executable instructions I0-I3 in FIG. 4B is based on an operand-based reach explicit consumer naming and provides the same function as the instruction stream 400 in FIG. 4A. As shown in FIG. 4B and discussed below, the operand-based reach explicit consumer naming supports allowing the replacement of the fusion instructions I3-I5 in the instruction stream 400 in FIG. 4A with an instruction I3 having three (3) operands without having to increase the operand reach namespace. Also, the operand-based reach explicit consumer naming in the instruction stream 402 in FIG. 4B allows for fewer instructions to be used to accomplish the desired operations leading to improvement in code density.

In this regard, as shown in FIG. 4A, instruction I5 is the intended ultimate instruction that effectively performs a predicated store operation based on a comparison of the data operands produced by instructions I1 and I3. However, the instruction-based reach explicit consumer naming in the instruction stream 400 is limited to two (2) operands in this example. To overcome this limitation, fusion instructions I3-I5 are included in instruction stream 400 that involve operands as inputs to a fused sequence of instructions due to the instruction reach namespace being limited to two (2) operands in this example. In this regard, producer instruction I0 in instruction stream 400 is a READ instruction that includes source register 'GPR0' (general purpose register 0) as an input and explicitly named operand 0 in the fused load target consumer instruction I3 (FUSEDLD) and the fused store on predicate instruction I5 (FUSEDST_T) at respective forward instruction target distances of '+3' and '+5' from instruction I0. Instruction I3 has one data operand as memory address read from register 'GPR0.' Producer instruction I1 in instruction stream 400 is a READ instruction that includes source register 'GPR1' (general purpose register 1) as an input and explicitly named operand 1 in the fused test of equal instruction I4 (FUSEDTEQ) at a forward instruction target distance of '+3' from instruction I1. Instruction I4 has two data operands, which are data from instruction I3 (FUSEDLD) and comparison data read from register 'GPR1.' Producer instruction I2 in instruction stream 400 is a READ instruction that includes source register 'GPR2' (general purpose register 2) as an input and explicitly named operand 1 in the fused store on predicate instruction I5 (FUSEDST_T) at a forward instruction target distance of '+3' from instruction I2. Instruction I5 has two data operands, which are memory address read from register 'GPR0' and store data read from register 'GPR2' and a predicate operand. Predicate instruction I5 (FUSEDST_T) stores out the operand produced from instruction I2 based on the predicate operand produced by instruction I4, which is based on forwarded operands produced by instructions I1 and I3, to effectively create a fused instruction with three (3) input data operands with an instruction-based reach explicit consumer naming that is limited to naming two (2) operands in an instruction reach namespace of a producer instruction.

In the instruction stream 402 in FIG. 4B based on an operand-based reach explicit consumer naming model, the compare-exchange instruction I3 (CMPXCHG) is intended as an ultimate instruction. Instruction I3 performs a compare-exchange operation based on three (3) data operands like the operations performed by the fused instructions I3-I5 in instruction stream 400 in FIG. 4A, but with fewer instructions. In this regard, producer instructions I0-I2 in instruction stream 402 are the same READ instructions I0-I2 from instruction stream 400 in FIG. 4A, but encoded with an operand consumer naming to pass or otherwise make available their respective produced values as operands 0, 1, and 2 to the compare-exchange instruction I3 (CMPXCHG). Thus, the operand-based reach explicit consumer naming model in instruction stream 402 in FIG. 4B supports the single instruction I3 to perform the task that requires three (3) fused instructions I3-I5 in the instruction stream 400 in FIG. 4A. Avoiding fused instructions in program code can simplify atomicity issues that can arise with complex instructions. Issues can arise with the use of fused instructions in an instruction stream, such as instruction stream 400 in FIG. 4B, such as when the fused instructions cross cache line boundaries. This can cause a separation of the fused instructions in an instruction pipeline that can cause quality of service (QoS) issues in a processor. Note that the operand-based reach explicit consumer naming model in the example instruction stream 402 in FIG. 4B avoided fused instructions at the instruction/program code level, but note that fusion may still be implemented in a processed execution of the instructions in the instruction stream 402 at the microcode/processor hardware level.

FIG. 5 is a schematic diagram of a processor-based system 500 that includes an exemplary operand-based reach explicit dataflow processor 502 ("processor 502") configured to support an operand-based reach explicit consumer communications model. The processor 502 includes an instruction processing circuit 504 that is configured to process instructions to be executed. The processor 502 may be an in-order processor or an out-of-order processor (OoP) as examples. Instructions 506 are fetched by an instruction fetch circuit 508 provided in the instruction processing circuit 504 from an instruction memory 510. The instruction memory 510 may be provided in or as part of a system memory in the processor-based system 500 as an example. An instruction cache 512 may also be provided in the processor 502 to cache the instructions 506 fetched from the instruction memory 510 to reduce latency in the instruction fetch circuit 508. The instruction fetch circuit 508 in this example is configured to provide the instructions 506 as fetched instructions 506F into one or more instruction pipelines $I_0$-$I_N$ as an instruction stream 511 in the instruction processing circuit 504 to be pre-processed, before the fetched instructions 506F reach an execution circuit 514 to be executed. The fetched instructions 506F in the instruction stream 511 include producer instructions and consumer instructions that consume produced values as a result of the instruction processing circuit 504 executing producer instructions. The instruction pipelines $I_0$-$I_N$ are provided across different processing circuits or stages of the instruction processing circuit 504 to pre-process and process the fetched instructions 506F in a series of steps that can be performed concurrently to increase throughput prior to execution of the fetched instructions 506F in the execution circuit 514.

A control flow prediction circuit 516 (e.g., a branch prediction circuit) is also provided in the instruction processing circuit 504 in the processor 502 in FIG. 5 to speculate or predict a target address for a control flow fetched instruction 506F, such as a conditional branch instruction. The prediction of the target address by the control flow prediction circuit 516 is used by the instruction fetch circuit 508 to determine the next fetched instructions 506F to fetch based on the predicted target address. The instruction processing circuit 504 also includes an instruction decode circuit 518 configured to decode the fetched instructions 506F fetched by the instruction fetch circuit 508 into decoded instructions 506D to determine the instruction type and actions required, which may also be used to determine into which instruction pipeline $I_0$-$I_N$ the decoded instructions 506D should be placed. The decoded instructions 506D are then placed into one or more of the instruction pipelines $I_0$-$I_N$ and are next provided to a rename circuit 520 in the instruction processing circuit 504. The rename circuit 520 is configured to determine if any register names in the decoded instructions 506D need to be renamed to break any register dependencies that would prevent parallel or out-of-order processing. The rename circuit 520 is configured to call upon a register map table (RMT) 522 to rename a logical source register operand and/or write a destination register operand of a decoded instruction 506D to available physical registers 524(1)-524(X) ($P_0$, $P_1$, . . . , $P_x$) in a physical register file (PRF) 526. The register map table (RMT) 522 contains a plurality of mapping entries each mapped to (i.e., associated with) a respective logical register $R_0$-$R_P$. The mapping entries are configured to store information in the form of an address pointer to point to a physical register 524(1)-524(X) in the physical register file (PRF) 526. Each physical register 524(1)-524(X) in the physical register file (PRF) 524 contains a data entry configured to store data for the source and/or a destination register operand of a decoded instruction 506D.

The instruction processing circuit 504 in the processor 502 in FIG. 5 also includes a register access circuit 528 prior to a dispatch circuit 530. The register access circuit 528 is configured to access a physical register 524(1)-524(X) in the physical register file (PRF) 526 based on a mapping entry mapped to a logical register $R_0$-$R_P$ in the register map table (RMT) 522 of a source register operand of a decoded instruction 506D to retrieve a produced value from an executed instruction 506E in the execution circuit 514. The register access circuit 528 is also configured to provide the retrieved produced value from an executed instruction 506E as the source register operand of a decoded instruction 506D to be executed. Also, in the instruction processing circuit 504, the dispatch circuit 530 is provided in the instruction pipeline $I_0$-$I_N$ and is configured to dispatch a decoded instruction 506D to the execution circuit 514 to be executed when all source register operands for the decoded instruction 506D are available. For example, the dispatch circuit 530 is responsible for making sure that the necessary values for operands of a decoded consumer instruction 506D are available before dispatching the decoded consumer instruction 506D to the execution circuit 514 for execution. The operands of a decoded instruction 506D can include immediate values, values stored in memory, and produced values from other decoded instructions 506D that would be considered producer instructions to the consumer instruction.

The execution circuit 514 is configured to execute decoded instructions 506D received from the dispatch circuit 530. Decoded instructions 506D that generate produced values to be consumed by a consumer instruction in the instruction processing circuit 504 are considered producer instructions. As discussed above, in the operand-based reach explicit consumer communications model supported by the processor 502 in FIG. 5, a decoded producer instruction 506D can name a consumer operand, and in such case would include an explicit consumer operand encoded by operand target distance 'TD+' representing a relative operand distance in the instruction stream 511 from the decoded producer instruction 506D, and an associated operand type 't.' The execution circuit 514 is configured to determine if an executed producer instruction 506E includes an explicit consumer operand name. If so, the write circuit 532 in the instruction processing circuit 504 is configured to write or otherwise make available the produced value generated by executed producer instruction 506E for the named operand in its consumer instruction 506D in the instruction processing circuit 504 identified as being located a distance away from the producer instruction 506D in the instruction stream 511 by the operand target distance value 'TD+' of the executed producer instruction 506E. In this example, the instruction processing circuit 504 includes an operand storage circuit 534 that is configured to receive and store produced values from the write circuit 532 that were generated by the execution circuit 514 by execution of a producer instruction 506D naming a consumer instruction 506D. The operand storage circuit 534 is configured to make the produced result available to the dispatch circuit 530 so that the produced value can be provided and made available for a named consumer operand for a consumer instruction 506D to be executed.

Note that a producer instruction 506D can also include more than one explicitly named consumer operand, in which case the write circuit 532 can store the produced result associated with more than one consumer operands for a consumer instruction(s) in the operand storage circuit 534 to be provided or made available to the dispatch circuit 530. Also note that as discussed above, the operand-based reach explicit consumer communications model supported by the processor 502 in FIG. 5 supports providing produced results from an executed producer instruction 506E as a predicate operand to a conditional consumer instruction 506D, such as a conditional branch instruction. In this example, the producer instruction 506D can include a named predicate operand of the intended conditional consumer instruction 506D that includes the operand target distance 'TD+' and a operand type 't' as a predicate operand (e.g., 'P'). The write circuit 532 can store the produced result as a predicate operand for a conditional consumer instruction 506D in the operand storage circuit 534 to be provided or made available to the dispatch circuit 530 when ready to dispatch the conditional consumer instruction 506D to be executed.

If a decoded instruction 506D that is executed does not explicitly name a consumer operand in the instruction stream 511, the write circuit 532 can write a produced result to a physical register $P_0$-$P_X$ in the physical register file 526 and/or memory called for in the decoded instruction 506D. If the desired target consumer operand that is to be the produced value from producer instruction 506D has an operand target distance farther away from the producer instruction 506D in the instruction stream 511 than the operand reach that can be encoded in the producer instruction 506D, the write circuit 532 can write a produced result to a physical register $P_0$-$P_X$ in the physical register file 526 to provide an implicit communication of the produced result to a consumer instruction 506D waiting to be dispatched to the execution circuit 514 for execution.

For example, as shown in FIG. 5, the operand storage circuit 534 could include data and predicate operand buffer circuits 536(1), 536(2) to store data operands and predicate operands, respectively. The data operand buffer circuit 536(1) in this example has a 'T+1' number of storage entries 538(0)-538(T) each configured to hold a produced data value from an executed producer instruction 506E. The predicate operand buffer circuit 536(2) in this example also has a 'U+1' number of storage entries 539(0)-539(U) each configured to hold a predicate value from an executed producer instruction 506E. The number of storage entries 538(0)-538(T) 'T+1' in the data operand buffer circuit 536(1) defines the data operand reach. The number of storage entries 539(0)-539(U) 'U+1' in the predicate operand buffer circuit 536(2) defines the predicate operand reach. For example, the write circuit 532 in the instruction processing circuit 504 in FIG. 5 could be confirmed to write a produced data value from an executed producer instruction 506E into a storage entry 538(0)-538(T) in the data operand buffer circuit 536(1) based on a data operand target distance in a named consumer operand. For example, if a data operand target distance were '+3' in a producer instruction 506D, the write circuit 532 could write the produced value from the execution of the producer instruction 506D forward three (3) entries in a storage entry 538(0)-538(T) in the data operand buffer circuit 536(1) based on a current location of a consumption read pointer 540(Op). The consumption read pointer 540(Op) then points to the next storage entry 538(0)-538(T) in the data operand storage circuit 536(1) to be consumed by a next named data operand in a consumer instruction 506D. Thus, dispatch circuit 530 can access a storage entry 538(0)-538(T) in the data operand buffer circuit 536(1) as the current location of the consumption read pointer 540(Op) when a consumer instruction 506D that has a named data operand is ready to be dispatched to the execution circuit 514 for execution. The dispatch circuit 530 may be configured to maintain and increment the address of the consumption read pointer 540(Op) as data operands for named operands in consumer instructions 506D are retrieved from the operand storage circuit 534 to then dispatch the consumer instructions 506D. The instruction processing circuit 504 has to discern the number of operands in an operand-based reach explicit consumer naming architecture, instead of counting instruction boundaries as would be performed in an instruction-based reach explicit consumer naming architecture.

Similarly, if a predicate operand target distance were '+3' in a producer instruction 506D, the write circuit 532 could write the produced value from the execution of the producer instruction 506D forward three (3) entries in a storage entry 539(0)-539(U) in the predicate operand buffer circuit 536(2) based on a current location of a consumption read pointer 540(P). The consumption read pointer 540(P) then points to the next storage entry 539(0)-539(U) in the predicate operand buffer circuit 536(2) to be consumed by a next named predicate operand in a consumer instruction 506D. Thus, dispatch circuit 530 can access a storage entry 539(0)-539(U) in the predicate operand buffer circuit 536(2) as the current location of the consumption read pointer 540(P) when a consumer instruction 506D that has a named predicate operand is ready to be dispatched to the execution circuit 514 for execution. The dispatch circuit 530 may be configured to maintain and increment the address of the consumption read pointer 540(P) as predicate operands for named operands in consumer instructions 506D are retrieved from the operand storage circuit 534 to then dispatch the consumer instructions 506D.

In an instruction-based reach explicit consumer naming model in an ISA that has two (2) operands, two (2) operands would be reserved in an operand storage circuit, similar to operand storage circuit 534, for every instruction. This can be an inefficient use of memory if the average number of operands per instruction may be less than two (2) operands. The operand-based reach explicit consumer naming model only needs to reserve operand storage in the operand storage circuit 534 as needed for a more efficient use of memory. Instructions that have N-number of operands consume exactly N operands in the operand storage circuit 534 in an operand-based reach explicit consumer naming model. The operand reach is optimized by removing ineffectual consumption in the operand storage circuit 534. The advantage of EDGE processors is preserved in an operand-based reach explicit consuming naming system, because once a producer value from execution of a producer instruction is consumed by an operand of a consumer instruction, the temporary storage of the produced value in the operand storage circuit 534 can be overwritten with another future produced value. An average number of operands per instruction of 'M,' where M<2, can reduce the number of storage entries 538(0)-538(T) in the operand storage circuit 534 by a factor of '2/M' to achieve a comparable performance. For example, if M=1, an instruction-based reach explicit consuming naming system with a reach of 128 instructions (256 total operands) should achieve comparable performance to an operand-based reach explicit consuming naming system with a reach of 128 operands.

FIG. 6 is a flowchart illustrating an exemplary process 600 of an operand-based reach explicit dataflow processor, such as the operand-based reach explicit dataflow processor 502 in FIG. 5, communicating produced values from executed producer instructions to be consumed by consumer operands in consumer instructions identified by operand-based reach explicit consumer instruction naming in the executed producer instructions. The process 600 in FIG. 6 will be discussed in conjunction with operations of the processor 502 in FIG. 5 as an example.

In this regard, the instruction processing circuit 504 receives a plurality of instructions 506 in the instruction stream 511 from the instruction memory 510 to be executed (block 602 in FIG. 6). The instruction fetch circuit 508 in the processor 502 is configured to fetch the instructions 506 from the instruction memory 510 and/or the instruction cache 512 if the instructions 506 are first fetched or pre-fetched into the instruction cache 512. The instructions can include a plurality of producer instructions and a plurality of consumer instructions. The execution circuit 514 executes a producer instruction 506D for the consumer instruction 506D to generate a produced value, the producer instruction 506D configured to include an explicit consumer name comprising an operand target distance (TD+) representing a relative operand distance in the instruction stream from the producer instruction 506D (block 604 in FIG. 6). The execution circuit 514 determines if the executed producer instruction 506E includes an explicit consumer operand name (block 606 in FIG. 6). In response to determining the executed producer instruction 506E includes an explicit consumer operand name (block 606 in FIG. 6), the write circuit 532 stores the produced value of the executed producer instruction 506E in the operand storage circuit 534 designated for an operand CO of the consumer operand in a consumer instruction 506D identified as being located an operand distance away from the producer instruction 506D in the instruction stream 511 by the operand target distance (TD+) of the executed producer instruction (block 608 in FIG. 6). The dispatch circuit 530 dispatches the consumer instruction 506D to the execution circuit 514 to be executed in response to the operand of the consumer instruction 506D being available in the operand storage circuit 534 (block 610 in FIG. 6).

To further illustrate differences between an exemplary instruction stream encoded based on an operand-based reach explicit consumer naming model versus an instruction stream encoded based on an instruction-based reach explicit consumer naming model, FIGS. 7A and 7B are provided. FIG. 7A illustrates an instruction stream 700 of computer instructions encoded with an instruction-based reach explicit consumer naming model and configured to be processed by an instruction-based reach explicit dataflow processor. FIG. 7B illustrates an instruction stream 702 of computer instructions encoded with an operand-based reach explicit con-sumer naming model and configured to be processed by an operand-based reach explicit dataflow processor, and that provide the same function as the instruction stream 700 in FIG. 7A.

As shown in FIG. 7A, the instruction stream 700 contains instructions I0-I12. Instruction I0 in instruction stream 700 is a READ instruction that includes source register of 'GPR0' (general purpose register 0) as an input and an explicitly named operand 0 of consumer instruction I5 at a forward instruction target distance of '+5' from the instruction I0 and an explicitly named consumer operand 0 of consumer instruction I6 at a forward instruction target distance of '+6' from the instruction I0. The arrows originating from one instruction to another show the logical designation paths of providing produced results to explicitly named consumer instructions. Instruction I1 in instruction stream 700 is a READ instruction that includes source register 'GPR1' (general purpose register 0) as an input and an explicitly named operand 1 of consumer instruction I9 at a forward instruction target distance of '+8' from the instruction I1. Instruction I2 in instruction stream 700 is a READ instruction that includes source register 'GPR2' (general purpose register 2) as an input and an explicitly named operand 1 of consumer instruction I10 at a forward instruction target distance of '+8' from the instruction I2. Instruction I3 in instruction stream 700 is a READ instruction that includes source register 'GPR3' (general purpose register 3) as an input and an explicitly named operand 1 of consumer instruction I11 at a forward instruction target distance of '+8' from the instruction I3. Instruction I4 in instruction stream 700 is a READ instruction that includes source register 'GPR4' (general purpose register 4) as an input and an explicitly named operand 1 of consumer instruction I12 at a forward instruction target distance of '+8' from the instruction I4. Instruction I5 in instruction stream 700 is a load instruction (LW) that includes a source operand from the produced value of instruction I0, and explicitly names operand 0 of consumer instruction I9 at a forward instruction target distance of '+4'. The other instructions I6-I12 also include explicit consumer instruction naming to provide or otherwise make available produced results to operands of other consumer instructions. The comments of the instructions I0-I12 in instruction stream 700 provide additional explanation about the instructions and their explicitly named consumer operands.

The instruction stream 702 in FIG. 7B is based on an operand-based reach explicit consumer naming model and also contains instructions I0-I12. Instruction I0 in instruction stream 702 is a READ instruction that includes source register 'GPR0' (general purpose register 0) as an input, an explicitly named consumer operand at forward operand target distance of '+1' from the instruction I0 (encoded as '<+1:Op>'), and an explicitly named consumer operand at a forward operand target distance of '+2' from the instruction I0 (encoded as '<+2:Op>'). The operand at forward operand target distance of '+1' from the instruction I0 is an operand of consumer instruction I5. The operand at forward operand target distance of '+2' from the instruction I0 is an operand of consumer instruction I6. The arrows originating from one instruction to another show the logical designation paths of providing produced results to explicitly named consumer operands of consumer instructions. The comments of the instructions I0-I12 in instruction stream 702 provide additional explanation about the instructions and their explicitly named consumer operands.

To further illustrate an operand-based reach explicit consumer communications model, FIG. 8A is provided to illustrate an exemplary instruction stream 800 of computer instructions I0-I7 that are configured to be executed by an operand-based reach explicit dataflow processor to perform operand-based reach explicit communication of produced values to named consumer operands. As shown in FIG. 8A, instruction I0 is an ADD instruction type that includes a named consumer operand at a forward operand target distance of '+2' from the instruction I0 to receive the produced value. Thus, the consumer instruction of producer instruction I0 is ADD instruction I3, because there is one (1) data operand after instruction I0 and before instruction I3 within instruction I1. Instruction I1 has a data operand. Instruction I1, a test if equal 0 and branch instruction (TEQZ.B), has a conditional branch location of instruction I5 if the condition is true. Because the conditional branch instruction I1 is located between producer instruction I0 and intended consumer instruction I3, the conditional branch instruction I1 will be executed before consumer instruction I3. The conditional branch instruction I1 in this example is located an operand distance from producer instruction I0 less than the named operand target distance value '+2.' The second operand (for an operand target distance of '+2') following instruction I0 is operand 0 of instruction I3 only if the conditional branch in instruction I1 is evaluated as not true and thus the branch not taken. If the branch is not taken from execution of instruction I1, instruction I2 is executed which names an operand at a target operand distance of '+2,' which is operand 1 in consumer instruction I3, such that instruction I3 adds the produced result from instruction I0 and instruction I2 and stores that result in register R6.

However, if the branch is taken in conditional branch instruction I1, the operand at an operand target distance of '+2' from instruction I0 will not be operand 1 in consumer instruction I3. This results in the creation of a spurious produced value if the branch in conditional branch instruction I1 is taken, because the intent of the instruction stream 800 is to have instruction I3 consume the produced result from the execution of instruction I0.

Thus, in this example, to prevent the incorrect delivery of a produced value to the consumer instruction I6 when the branch is taken from execution of the conditional branch instruction I1, instruction I5 is provided to perform a WAW operation in the branch taken dataflow path 802 from execution of instruction I1 in instruction stream 800, which also specifies a consumer operand in instruction I6 as its consumer. The produced value from instruction I1 is orphaned when the produced value from instruction I1 is overwritten by instruction I5. Thus, instruction I5 is considered a WAW instruction located in the instruction stream 800 between the branch taken instruction I6 and the consumer instruction I3. In this manner, the produced value from instruction I0 is overwritten by the producer instruction I5 if the branch in the conditional branch instruction I1 is taken to avoid instruction I6 consuming an unintended result from instruction I0. A programmer or compiler producing instructions according to a operand-based reach explicit consumer communications model can be configured to recognize a spurious produced value situation and prevent the incorrect delivery of a produced value to an operand in consumer instruction I6 when the branch is taken from execution of the conditional branch instruction I1 by employing another producer instruction (e.g., instruction I5 in FIG. 8A) in the taken flowpath to perform a write-after-write (WAW) operation. This additional producer instruction I5 encodes an operand target distance corresponding to the intended consumer operand (e.g., in instruction I6 in FIG. 8A) and the consumer operand of the producer instruction (e.g., instruction I0 in FIG. 8A) that created the spurious produced value. This has the effect of causing the overwriting of the unintended produced value from being consumed by the unintended consumer instruction.

FIGS. 8B and 8C illustrate two other similar instruction streams 804, 806 for comparison to instruction stream 800 in FIG. 8A. Instruction stream 804 is encoded using an implicit consumer communications model. Instruction stream 806 is encoded using an instruction-based explicit consumer communications model using an encoded location based on the start of an instruction block, respectively. Instruction stream 804 is based on an implicit consumer communications model that includes instructions I10-I17. These instructions I10-I17 have the same instruction type as instructions I0-I7 in instruction stream 800 and are encoded to cause a processor to generate the same results, but the instruction stream 804 uses register names to perform implicit consumer naming in producer instructions. Instruction stream 806 includes instructions I20-I27. These instructions I20-I27 have the same instruction type as instructions I0-I7 in instruction stream 800 and are encoded to cause a processor to generate the same results, but the instruction stream 806 uses explicit naming based on the absolute instruction locations relative to the start of an instruction block to name consumers in producer instructions.

As discussed above in the example instruction stream 800 in FIG. 8A, operand-based reach explicit consumer naming can create WAW hazards when conditional branch instructions are located between a producer instruction and its intended target consumer operand such that the relative operand target distance from the producer instruction can change based on whether the branch is taken or not taken. As discussed above in FIG. 8A, one way to resolve this hazard is to provide a producer instruction in the branch taken path, for example, if the intended named consumer in an earlier producer instruction is in the not taken path, to write or overwrite the produced results. An example of this was shown as the WAW instruction I5 in FIG. 8A. However, there are other ways to construct instruction streams that can resolve WAW hazards.

In this regard, FIG. 9A is an exemplary instruction stream 900 of computer instructions I0-I11 encoded with operand-based reach explicit consumer instruction naming and configured to be processed by an operand-based reach dataflow processor, such as the processor 502 in FIG. 5. In this example instruction stream 900, a WAW hazard is present due to a test if equal and branch instruction I6, which is a branch-based instruction. Instruction I5 creates a WAW hazard with producer instruction I3 if the condition in test if equal and branch instruction I6 is resolved to branch taken. Producer instruction I3 names operand 0 in instruction I5 as a consumer, and instruction I5 then names an operand with an operand target distance of '+2,' which is operand 0 in instruction I7. Instruction I6 is a conditional branch instruction following instruction I5. Thus, if the branch is taken in test if equal and branch instruction I6, the produced value from execution of instruction I5 is communicated to an operand in instruction I9 and not intended operand 0 in consumer instruction I7. Thus, this WAW hazard will incorrectly provide the produced value from instruction I5 to an operand in consumer instruction I9 instead of operand 0 in instruction I7, which is not the behavior intended by the programmer in this example. A second WAW hazard exists in the case where the branch from instruction I6 is not taken, in that the second target operand of '+6' in instruction I3 targets an operand of instruction I7 that is subsequently also targeted by the result of instruction I5. In this case, the desired behavior occurs, because instruction I5 is newer in the instruction stream 900 order than instruction I3.

To resolve the WAW hazard discussed above of the produced value from execution of instruction I5 being communicated to an operand in instruction I9 and not intended operand 0 in consumer instruction I7 in the instruction stream 900 in FIG. 9A, FIG. 9B is an alternative exemplary instruction stream 902 with instructions I0-I12 to carry out the same and intended operations of the instruction stream 900 in FIG. 9A when executed by an operand-based reach explicit dataflow processor, such as processor 502 in FIG. 5. Instructions I0-I4 are the same between the instruction stream 902 in FIG. 9B and the instruction stream 900 in FIG. 9A. Also, instructions I7-I12 in the instruction stream 902 in FIG. 9B are the same instruction types with the same intended operands and consumed values as instructions I6-I11 in the instruction stream 900 in FIG. 9A. To resolve the above noted WAW hazard in the instruction stream 900 in FIG. 9A, the instruction stream 902 in FIG. 9B includes an additional test instruction I5 between what are instructions I4 and I5 in the instruction stream 900 in FIG. 9A. Also, the instruction I6 in FIG. 9B, which was based on test instruction I5 in the instruction stream 900 in FIG. 9A, is changed to a predicate consumer instruction I6 (a subtraction—SUB). The predicate consumer instruction I6 is located between the producer instruction I3 and the test and branch instruction I7, which is a branch-based instruction predicated based on the test condition. A test instruction I5, as a predicate producer instruction that has the opposite condition as test and branch instruction I7, is inserted before the predicate consumer instruction I6 so that predicate consumer instruction I6 only generates a value when the condition of inserted test instruction I5 is resolved as true. The test instruction I5 is inserted to be located an operand target distance from a named consumer instruction in the producer instruction I3. In this manner, the instructions in the instruction stream 902 in FIG. 9B are arranged for the produced value from producer instruction I2 to only be valid for the not taken flowpath of the test and branch instruction I7 to avoid the WAW hazard that was created by test and branch instruction I7. However, the WAW hazard caused by the second target operand of '+7' in instruction I3 targeting an operand of instruction I10 if the branch is not taken in test and branch instruction I7 is not resolved in the instruction stream 902 in FIG. 9B.

FIG. 10 is another exemplary instruction stream 1000 of computer instructions encoded with operand-based reach explicit consumer instruction naming and configured to be processed by an operand-based reach dataflow processor, wherein a WAW hazard is resolved. As discussed below, the WAW hazard is resolved by providing instructions and encoding so that a produced value is not communicated to an unintended consumer operand if a branch from a resolved conditional branch instruction is taken. In this regard, as shown in FIG. 10, instruction I2 is a producer instruction that targets operand 0 in consumer instruction I5 as a consumer operand based on the consumer operand naming of <+2:Op> indicating an operand target distance of '+2' from instruction I2. However, test and branch instruction I4, which is a branch-based instruction, between the producer instruction I2 and the intended consumer instruction I5, is a conditional branch instruction. In this example, the WAW hazard is resolved by providing an encoding mechanism to support an invalidate operand to be included in a conditional branch instruction. The invalidate operand is included in a special invalidate test and branch instruction I4 that is configured to instruct a processor to invalidate the produced value generated from execution of producer instruction I2 if the test and branch instruction I4 is resolved as branch taken. In this manner, the produced value from instruction I3 is not communicated to an unintended consumer operand in the taken dataflow path of the instruction stream 300 when the branch is taken from test and branch instruction I4. The special invalidate conditional branch instruction can be noted by a unique or variation of an opcode of a like-kind conditional branch instruction, for example.

FIG. 11 is a block diagram of an exemplary processor-based system 1100 that includes a reach-based explicit dataflow processor 1102 ("processor 1102") configured to support execution of producer instructions encoded with reach-based explicit naming of consumer instructions intended to consume the values produced by the producer instructions. For example, the processor 1102 in FIG. 11 could be the processor 502 in FIG. 5. The processor-based system 1100 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 1100 includes the processor 1102. The processor 1102 represents one or more general-purpose processing circuits, such as a microprocessor, central processing unit, or the like. More particularly, the processor 1102 may be an EDGE instruction set microprocessor, or other processor implementing an instruction set that supports explicit consumer naming for communicating produced values resulting from execution of producer instructions. The processor 1102 is configured to execute processing logic in instructions for performing the operations and steps discussed herein. In this example, the processor 1102 includes an instruction cache 1104 for temporary, fast access memory storage of instructions and an instruction processing circuit 1110. Fetched or prefetched instructions from a memory, such as from the system memory 1108 over a system bus 1106, are stored in the instruction cache 1104. The instruction processing circuit 1110 is configured to process instructions fetched into the instruction cache 1104 and process the instructions for execution. The instruction processing circuit 1110 is compatible with an operand-based reach explicit consumer communications model and instruction encoding such that the instruction processing circuit 1110 supports execution of producer instructions encoded with operand-based reach explicit naming of consumer operands such that these produced values are communicated as input values to the named consumer operands in consumer instructions for execution.

The processor 1102 and the system memory 1108 are coupled to the system bus 1106 and can intercouple peripheral devices included in the processor-based system 1100. As is well known, the processor 1102 communicates with these other devices by exchanging address, control, and data information over the system bus 1106. For example, the processor 1102 can communicate bus transaction requests to a memory controller 1112 in the system memory 1108 as an example of a slave device. Although not illustrated in FIG. 11, multiple system buses 1106 could be provided, wherein each system bus constitutes a different fabric. In this example, the memory controller 1112 is configured to provide memory access requests to a memory array 1114 in the system memory 1108. The memory array 1114 is comprised of an array of storage bit cells for storing data. The system memory 1108 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1106. As illustrated in FIG. 11, these devices can include the system memory 1108, one or more input device(s) 1116, one or more output device(s) 1118, a modem 1124, and one or more display controllers 1120, as examples. The input device(s) 1116 can include any type of input device, including but not limited to input keys, switches, voice processors, etc. The output device(s) 1118 can include any type of output device, including but not limited to audio, video, other visual indicators, etc. The modem 1124 can be any device configured to allow exchange of data to and from a network 1126. The network 1126 can be any type of network, including but not limited to a wired or wireless network, a private or public network, a local area network (LAN), a wireless local area network (WLAN), a wide area network (WAN), a BLUETOOTH™ network, and the Internet. The modem 1124 can be configured to support any type of communications protocol desired. The processor 1102 may also be configured to access the display controller(s) 1120 over the system bus 1106 to control information sent to one or more displays 1122. The display(s) 1122 can include any type of display, including but not limited to a cathode ray tube (CRT), a liquid crystal display (LCD), a plasma display, etc.

The processor-based system 1100 in FIG. 11 may include a set of instructions 1128 that may be encoded with the operand-based reach explicit consumer naming model to be executed by the processor 1102 for any application desired according to the instructions. The instructions 1128 may be stored in the system memory 1108, processor 1102, and/or instruction cache 1104 as examples of a non-transitory computer-readable medium 1130. The instructions 1128 may also reside, completely or at least partially, within the system memory 1108 and/or within the processor 1102 during their execution. The instructions 1128 may further be transmitted or received over the network 1126 via the modem 1124, such that the network 1126 includes the computer-readable medium 1130.

While the computer-readable medium 1130 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor configured to:
   receive a plurality of instructions in an instruction stream from an instruction memory to be executed, the plurality of instructions comprising a plurality of producer instructions and a plurality of consumer instructions;
   execute a producer instruction among the plurality of producer instructions to generate a produced value, the producer instruction configured to include an explicit consumer operand name comprising an operand target distance representing a relative operand distance in the instruction stream from the producer instruction;
   determine if the executed producer instruction includes an explicit consumer operand name;
   in response to determining the executed producer instruction includes an explicit consumer operand name, write the produced value of the executed producer instruction to an operand of a consumer instruction among the plurality of consumer instructions identified an operand distance away from the producer instruction in the instruction stream by the operand target distance in the explicit consumer operand name of the executed producer instruction; and
   dispatch the consumer instruction to be executed in response to an operand of the consumer instruction being available.

2. The processor of claim 1, further configured to:
   determine if the executed producer instruction includes a second explicit consumer operand name comprising a second operand target distance representing a second relative operand distance in the instruction stream from the producer instruction;
   in response to determining the executed producer instruction includes a second explicit consumer operand name, write the produced value of the executed producer instruction to the operand of a second consumer instruction among the plurality of consumer instructions identified a second operand distance away from the producer instruction in the instruction stream by the second operand target distance in the second explicit consumer operand name of the executed producer instruction; and
   dispatch the second consumer instruction to be executed in response to an operand of the second consumer instruction being available.

3. The processor of claim 1, configured to dispatch the consumer instruction among the plurality of consumer instructions to be executed in response to the first operand and a second operand of the consumer instruction being available; and
   the processor further configured to:
      execute a second producer instruction among the plurality of producer instructions to generate a second produced value, the second producer instruction configured to include a second explicit consumer operand name comprising an operand target distance representing a relative operand distance in the instruction stream from the second producer instruction targeting the second operand in the consumer instruction;
      determine if the executed second producer instruction includes a second explicit consumer operand name; and
      in response to determining the executed second producer instruction includes the second explicit consumer operand name, write the second produced value of the executed second producer instruction to the second operand of the consumer instruction identified an operand distance away from the second producer instruction in the instruction stream by the operand target distance in the second explicit consumer operand name of the executed second producer instruction.

4. The processor of claim 3, configured to dispatch the consumer instruction among the plurality of consumer instructions to be executed in response to the first operand, the second operand, and a third operand of the consumer instruction being available;
   the processor further configured to:
      execute a third producer instruction among the plurality of producer instructions to generate a third produced value, the third producer instruction configured to include a third explicit consumer operand name comprising an operand target distance representing a relative operand distance in the instruction stream from the third producer instruction targeting the third operand in the consumer instruction;

determine if the executed third producer instruction includes a third explicit consumer operand name; and in response to determining the executed third producer instruction includes the third explicit consumer operand name, write the third produced value of the executed third producer instruction to the third operand of the consumer instruction identified an operand distance away from the third producer instruction in the instruction stream by the operand target distance in the third explicit consumer operand name of the executed third producer instruction.

5. The processor of claim 4, wherein the second producer instruction and the third producer instruction are the same producer instruction.

6. The processor of claim 4, wherein the consumer instruction does not comprise a fused instruction.

7. The processor of claim 1, further configured to:

execute the producer instruction to generate a second produced value;

dispatch a second consumer instruction among the plurality of consumer instructions to be executed in response to an operand of the second consumer instruction being available;

determine if the executed producer instruction includes a second explicit consumer operand name comprising a second operand target distance representing a second relative operand distance in the instruction stream from the producer instruction and a second produced value; and in response to determining the executed producer instruction includes a second explicit consumer operand name and the second produced value, write the second produced value of the executed producer instruction to the operand of the second consumer instruction identified a second operand distance away from the producer instruction in the instruction stream by the second operand target distance in the second explicit consumer operand name of the executed producer instruction.

8. The processor of claim 1, configured to:

execute the producer instruction among the plurality of producer instructions to generate the produced value, the producer instruction configured to include the explicit consumer operand name comprising an explicit consumer data operand name comprising the operand target distance representing a relative data operand distance in the instruction stream from the producer instruction; and in response to determining the executed producer instruction includes an explicit consumer data operand name, write the produced value of the executed producer instruction to a data operand of the consumer instruction comprising a data consumer instruction identified a data operand distance away from the producer instruction in the instruction stream by the operand target distance in the explicit consumer data operand name of the executed producer instruction.

9. The processor of claim 1, configured to:

dispatch the consumer instruction comprising a conditional consumer instruction to be executed in response to a predicate operand of the consumer instruction being available;

execute the producer instruction among the plurality of producer instructions to generate the produced value, the producer instruction configured to include the explicit consumer operand name comprising an explicit consumer predicate operand name comprising the operand target distance representing a relative predicate operand distance in the instruction stream from the producer instruction; and in response to determining the executed producer instruction includes an explicit consumer predicate operand name, write the produced value of the executed producer instruction to the predicate of the conditional consumer instruction identified a predicate operand distance away from the producer instruction in the instruction stream by the operand target distance in the explicit consumer predicate operand name of the executed producer instruction.

10. The processor of claim 1, comprising:

an instruction processing circuit configured to receive the plurality of instructions in the instruction stream from the instruction memory to be executed, the plurality of instructions comprising the plurality of producer instructions and the plurality of consumer instructions;

the instruction processing circuit comprising:

an operand storage circuit configured to store a produced value associated with an operand of a received consumer instruction among the plurality of consumer instructions;

a dispatch circuit configured to dispatch the consumer instruction to an execution circuit to be executed in response to the produced value associated with the operand of the consumer instruction being available in the operand storage circuit;

the execution circuit configured to execute the producer instruction among the plurality of producer instructions to generate the produced value; and a write circuit configured to:

determine if the executed producer instruction includes an explicit consumer operand name; and in response to determining the executed producer instruction includes an explicit consumer operand name, write to the operand storage circuit the produced value of the executed producer instruction associated with the operand of the consumer instruction identified an operand distance away from the producer instruction in the instruction stream by the operand target distance in the explicit consumer operand name of the executed producer instruction.

11. The processor of claim 10, wherein:

the operand storage circuit comprises a plurality of storage entries each configured to store a produced value associated with the operand of the received consumer instruction; and the dispatch circuit is further configured to:

retrieve a produced value for the operand of the consumer instruction from a storage entry at an address of a consumption read pointer in the operand storage circuit; and increment the address of the consumption read pointer to point to a next storage entry in the operand storage circuit in response to dispatching the consumer instruction to the execution circuit.

12. The processor of claim 10, wherein the instruction processing circuit further comprises a decoder circuit configured to:
  decode the received producer instruction into a decoded producer instruction; and
  decode the received consumer instruction into a decoded consumer instruction;
  wherein:
    the operand storage circuit is configured to store the produced value associated with an operand of the decoded consumer instruction;
    the dispatch circuit is configured to dispatch the decoded consumer instruction to an execution circuit to be executed in response to the produced value associated with the operand of the decoded consumer instruction being available in the operand storage circuit;
    the execution circuit is configured to execute the decoded producer instruction to generate the produced value, the decoded producer instruction comprising the explicit consumer operand name comprising the operand target distance representing the relative operand distance in the instruction stream from the producer instruction; and
    the write circuit is configured to, in response to determining the executed decoded producer instruction includes the explicit consumer operand name, write to the operand storage circuit the produced value of the executed decoded producer instruction associated with the operand of the decoded consumer instruction identified the operand distance away from the producer instruction in the instruction stream by the operand target distance in the explicit consumer operand name of the executed decoded producer instruction.

13. The processor of claim 10, wherein:
  the instruction processing circuit is further configured to map the operand of the consumer instruction to a physical register; and
  the instruction processing circuit is further configured to, in response to determining the executed producer instruction does not include an explicit consumer operand name, write the produced value of the executed producer instruction to the physical register mapped to the operand of the consumer instruction.

14. The processor of claim 13, wherein the instruction processing circuit further comprises a register access circuit configured to:
  access the physical register mapped to the operand of the consumer instruction to retrieve the produced value of the executed producer instruction; and
  provide the retrieved produced value as the operand of the consumer instruction.

15. The processor of claim 13, further comprising:
  a physical register file comprising a plurality of physical registers; and
  a register map table comprising a plurality of mapping entries each configured to store at least one address pointer pointing to an address of a physical register in the physical register file;
  wherein:
    the instruction processing circuit is configured to map the operand of the consumer instruction to a mapping entry in the register map table mapped to the physical register among the plurality of physical registers in the physical register file; and
    in response to determining the executed producer instruction does not include the explicit consumer operand name, write the produced value of the executed producer instruction to a logical register mapped to the mapping entry in the register map table mapped to the operand of the consumer instruction.

16. The processor of claim 10, further comprising the instruction memory configured to store the plurality of instructions.

17. The processor of claim 1 comprising an out-of-order processor (OoP).

18. A method of providing a produced value from a producer instruction executed by a processor as an input to an operand of a consumer instruction based on an explicit naming of the consumer operand in the producer instruction, comprising:
  receiving a plurality of instructions in an instruction stream from an instruction memory to be executed, the plurality of instructions comprising a plurality of producer instructions and a plurality of consumer instructions;
  executing a producer instruction among the plurality of producer instructions to generate a produced value, the producer instruction configured to include an explicit consumer operand name comprising an operand target distance representing a relative operand distance in the instruction stream from the producer instruction;
  determining if the executed producer instruction includes an explicit consumer operand name;
  in response to determining the executed producer instruction includes an explicit consumer operand name, store the produced value of the executed producer instruction to an operand of a consumer instruction among the plurality of consumer instructions identified an operand distance away from the producer instruction in the instruction stream by the operand target distance in the explicit consumer operand name of the executed producer instruction; and
  dispatching the identified consumer instruction to be executed in response to the operand of the consumer instruction being available.

19. The method of claim 18, further comprising:
  dispatching a second consumer instruction among the plurality of consumer instructions to be executed in response to an operand of the second consumer instruction being available;
  determining if the executed producer instruction includes a second explicit consumer operand name comprising a second operand target distance representing a second relative operand distance in the instruction stream from the producer instruction; and
  in response to determining the executed producer instruction includes a second explicit consumer operand name, writing the produced value of the executed producer instruction to the operand of the second consumer instruction identified a second operand distance away from the producer instruction in the instruction stream by the second operand target distance in the second explicit consumer operand name of the executed producer instruction.

20. The method of claim 18, comprising:
  dispatching the consumer instruction comprising a data consumer instruction to be executed in response to a data operand of the data consumer instruction being available;

executing the producer instruction among the plurality of producer instructions to generate the produced value, the producer instruction configured to include an explicit consumer data operand name comprising the operand target distance representing a relative data operand distance in the instruction stream from the producer instruction;

determining if the executed producer instruction includes an explicit consumer data operand name; and in response to determining the executed producer instruction includes an explicit consumer data operand name, store the produced value of the executed producer instruction to the data operand of the data consumer instruction identified a data operand distance away from the producer instruction in the instruction stream by the operand target distance in the explicit consumer data operand name of the executed producer instruction.

21. The method of claim 18, comprising:

dispatching the consumer instruction comprising a conditional consumer instruction to be executed in response to a predicate operand of the consumer instruction being available;

executing the producer instruction among the plurality of producer instructions to generate the produced value, the producer instruction configured to include the explicit consumer operand name comprising an explicit consumer predicate operand name comprising the operand target distance representing a relative predicate operand distance in the instruction stream from the producer instruction; and in response to determining the executed producer instruction includes an explicit consumer predicate operand name, writing the produced value of the executed producer instruction to the predicate of the conditional consumer instruction identified a predicate operand distance away from the producer instruction in the instruction stream by the operand target distance in the explicit consumer predicate operand name of the executed producer instruction.

22. The method of claim 18, further comprising:

mapping the operand of the consumer instruction to a physical register; and in response to determining the executed producer instruction does not include an explicit consumer operand name, writing the produced value of the executed producer instruction to the physical register mapped to the operand of the consumer instruction.

23. The method of claim 22, further comprising:

accessing the physical register mapped to the operand of the consumer instruction to retrieve the produced value of the executed producer instruction; and providing the retrieved produced value as the operand of the consumer instruction.

24. A non-transitory computer-readable medium having stored thereon an instruction program comprising a plurality of computer executable instructions for execution by a processor, the plurality of computer executable instructions comprising:

a producer instruction comprising an instruction type and an explicit consumer operand name comprising an operand target distance representing a relative operand distance in the instruction program from the producer instruction; and a consumer instruction comprising an instruction type and an operand, the operand of the consumer instruction being an operand distance away from the producer instruction in the instruction program by the operand target distance in the explicit consumer operand name of the producer instruction.

25. The non-transitory computer-readable medium of claim 24, wherein:

the producer instruction further comprises a second explicit consumer operand name comprising a second operand target distance representing a second relative operand distance in the instruction program from the producer instruction; and the plurality of computer executable instructions further comprises a second consumer instruction comprising a second instruction type and a second operand, the second operand of the second consumer instruction being a second operand distance away from the producer instruction in the instruction program by the second operand target distance in the second explicit consumer operand name of the producer instruction.

26. The non-transitory computer-readable medium of claim 24, the plurality of computer executable instructions further comprising:

a conditional branch instruction comprising a conditional branch location, the conditional branch instruction located between the producer instruction and the consumer instruction in the instruction program, the conditional branch instruction located in the instruction program an operand distance from the producer instruction less than the operand target distance in the explicit consumer operand name of the producer instruction;

a branch taken instruction comprising an evaluation operand, the branch taken instruction located in the instruction program at the conditional branch location in the conditional branch instruction; and a write-after-write (WAW) instruction located in the instruction program between the branch taken instruction and the consumer instruction, the WAW instruction configured to produce the evaluation operand of the branch taken instruction.

27. The non-transitory computer-readable medium of claim 24, the plurality of computer executable instructions further comprising:

a branch-based instruction comprising a predicate, the branch-based instruction located between the producer instruction and the consumer instruction in the instruction program, the branch-based instruction located in the instruction program an operand distance from the producer instruction less than the operand target distance value in the explicit consumer operand name of the producer instruction;

a predicate producer instruction comprising the predicate of the branch-based instruction, the predicate producer instruction located between the producer instruction and the branch instruction in the instruction program; and a predicate producer instruction located between the predicate instruction and the conditional branch instruction in the instruction program, the predicate producer consumer instruction comprising the predicate of the branch-based instruction and a second explicit consumer operand name comprising a second operand target distance representing a second relative operand distance in the instruction program from the predicate consumer instruction, the predicate consumer instruction located an operand distance of the second operand target distance from the consumer instruction in the instruction program;

the predicate consumer instruction configured to only cause the processor to execute the predicate consumer instruction to generate a predicate produced value for the operand of the consumer instruction in response to the predicate of the predicate producer instruction resolving to a not taken state of the branch-based instruction.

28. The non-transitory computer-readable medium of claim 24, the plurality of computer executable instructions further comprising:
an invalidate conditional branch instruction comprising a predicate and a conditional branch location, the invalidate conditional branch instruction located between the producer instruction and the consumer instruction in the instruction program, the invalidate conditional branch instruction located in the instruction program an operand distance from the producer instruction less than the operand target distance in the explicit consumer operand name of the producer instruction;
the invalidate conditional branch instruction configured to cause the processor executing the invalidate conditional branch instruction to invalidate a produced value generated by execution of the producer instruction in response to the predicate of the invalidate conditional branch instruction resolving to a taken state.

29. The non-transitory computer-readable medium of claim 24, the plurality of computer executable instructions further comprising:
a second producer instruction comprising a second instruction type and a second explicit consumer operand name comprising an operand target distance representing a relative operand distance in the instruction program from the second producer instruction; and
a third producer instruction comprising a third instruction type and a third explicit consumer operand name comprising an operand target distance representing a relative operand distance in the instruction program from the third producer instruction;
the consumer instruction further comprising a second operand and a third operand, the second operand of the consumer instruction being an operand distance away from the second producer instruction in the instruction program by the operand target distance in the second explicit consumer operand name of the second producer instruction, and the third operand of the consumer instruction being an operand distance away from the third producer instruction in the instruction program by the operand target distance in the third explicit consumer operand name of the third producer instruction.

30. The non-transitory computer-readable medium of claim 29, wherein the consumer instruction does not comprise a fused instruction.

* * * * *